US012741674B2

(12) United States Patent
Hasuo et al.

(10) Patent No.: US 12,741,674 B2
(45) Date of Patent: Sep. 22, 2026

(54) SAFETY RULE GENERATION DEVICE, NAVIGATION SYSTEM, SAFETY RULE GENERATION METHOD, NAVIGATION METHOD, AND PROGRAM

(71) Applicant: INTER-UNIVERSITY RESEARCH INSTITUTE CORPORATION RESEARCH ORGANIZATION OF INFORMATION AND SYSTEMS, Tokyo (JP)

(72) Inventors: Ichiro Hasuo, Tokyo (JP); Clovis Eberhart, Tokyo (JP); James Haydon, Tokyo (JP); Jeremy Dubut, Tokyo (JP); Rose Bohrer, Tokyo (JP); Erik Andre Pallas, Tokyo (JP); Tsutomu Kobayashi, Tokyo (JP); Sasinee Pruekprasert, Tokyo (JP); Xiaoyi Zhang, Tokyo (JP); Akihisa Yamada, Tokyo (JP); Kohei Suenaga, Tokyo (JP); Fuyuki Ishikawa, Tokyo (JP)

(73) Assignee: INTER-UNIVERSITY RESEARCH INSTITUTE CORPORATION RESEARCH ORGANIZATION OF INFORMATION AND SYSTEMS, Tokyo (JP)

( * ) Notice: Subject to any disclaimer, the term of this patent is extended or adjusted under 35 U.S.C. 154(b) by 103 days.

(21) Appl. No.: 18/854,285

(22) PCT Filed: Apr. 11, 2023

(86) PCT No.: PCT/JP2023/014681

§ 371 (c)(1),
(2) Date: Oct. 4, 2024

(87) PCT Pub. No.: WO2023/204098

PCT Pub. Date: Oct. 26, 2023

(65) Prior Publication Data

US 2025/0340216 A1 Nov. 6, 2025

(30) Foreign Application Priority Data

Apr. 19, 2022 (JP) ................................ 2022-069068

(51) Int. Cl.
*B60W 60/00* (2020.01)
*B60W 30/18* (2012.01)

(52) U.S. Cl.
CPC .. *B60W 60/0011* (2020.02); *B60W 30/18163* (2013.01); *B60W 60/0015* (2020.02); *B60W 2540/215* (2020.02)

(58) Field of Classification Search
CPC ............. B60W 60/00; B60W 60/0011; B60W 60/0015; B60W 30/18163; G05B 19/04
(Continued)

(56) References Cited

U.S. PATENT DOCUMENTS 10,331,129 B2 * 6/2019 Iagnemma ......... B62D 15/0285
2021/0370980 A1 12/2021 Ramamoorthy et al.
(Continued)

FOREIGN PATENT DOCUMENTS

DE 102017213353 2/2019
JP 2015-194917 11/2015
(Continued)

OTHER PUBLICATIONS

Extended European search report mailed on Jul. 30, 2025 with respect to the corresponding European patent application No. 23791746.3.

(Continued)

*Primary Examiner* — Andrew Joseph Rudy
(74) *Attorney, Agent, or Firm* — IPUSA, PLLC

(57) ABSTRACT

A safety rule capable of coping with a complex scenario is formulated. A safety rule generation device includes an input unit configured to receive an input of scenario information
(Continued)

representing a predetermined scenario by chaining subscenarios in which a control strategy and a goal are associated, a precondition calculation unit configured to calculate a precondition for executing the control strategy while achieving the goal for each of the subscenarios, and an output unit configured to output safety rule information obtained by combining the precondition and the control strategy for each of the subscenarios.

20 Claims, 19 Drawing Sheets

(58) Field of Classification Search
USPC ........................................................ 701/25
See application file for complete search history.

(56) References Cited

U.S. PATENT DOCUMENTS

| | | | | |
|---|---|---|---|---|
| 2022/0041180 | A1 | 2/2022 | Choi et al. | |
| 2022/0135065 | A1 | 5/2022 | Okada | |
| 2023/0063368 | A1* | 3/2023 | Lopez | B60W 30/09 |
| 2023/0401911 | A1* | 12/2023 | Zhu | G06V 20/58 |
| 2024/0123615 | A1* | 4/2024 | Whiteside | G06F 11/3692 |

FOREIGN PATENT DOCUMENTS

| | | |
|---|---|---|
| JP | 2020-187754 | 11/2020 |
| JP | 2021-014235 | 2/2021 |
| WO | 2018/115963 | 6/2018 |
| WO | 2021/247081 | 12/2021 |
| WO | 2022/056255 | 3/2022 |

OTHER PUBLICATIONS

Office Action mailed on Mar. 24, 2026 with respect to the corresponding Japanese patent application No. 2024-220513.

Shai Shalev-Shwartz, Shaked Shammah, and Amnon Shashua, "On a formal model of safe and scalable self-driving cars," CoRR, abs/1708.06374, 2017, Oct. 27, 2018 version.

C. A. R. Hoare, "An axiomatic basis for computer programming," Communications of the ACM, vol. 12, pp. 576-580, 583, Oct. 1969.

F. S. de Boer, U. Hannemann, and W. P. de Roever, "Hoare-style compositional proof systems for reactive shared variable concurency," in Foundations of Software Technology and Theoretical Computer Science, 17th Conference, Kharagpur, India, Dec. 18-20, 1997.

T. L. Crenshaw, E. Gunter, C. L. Robinson, L. Sha, and P. R. Kumar, "The simplex reference model: Limiting fault-propagation due to unreliable components in cyber-physical system architectures," in 28th IEEE International Real-Time Systems Symposium (RTSS 2007), 2007.

D. Seto, B. Krogh, L. Sha, and A. Chutinan, "The simplex architecture for safe online control system upgrades," in Proceedings of the 1998 American Control Conference. ACC (IEEE Cat. No. 98CH36207), vol. 6, 1998, pp. 3504-3508.

International Search Report for PCT/JP2023/014681 mailed on Jul. 4, 2023.

* cited by examiner

FIG.4

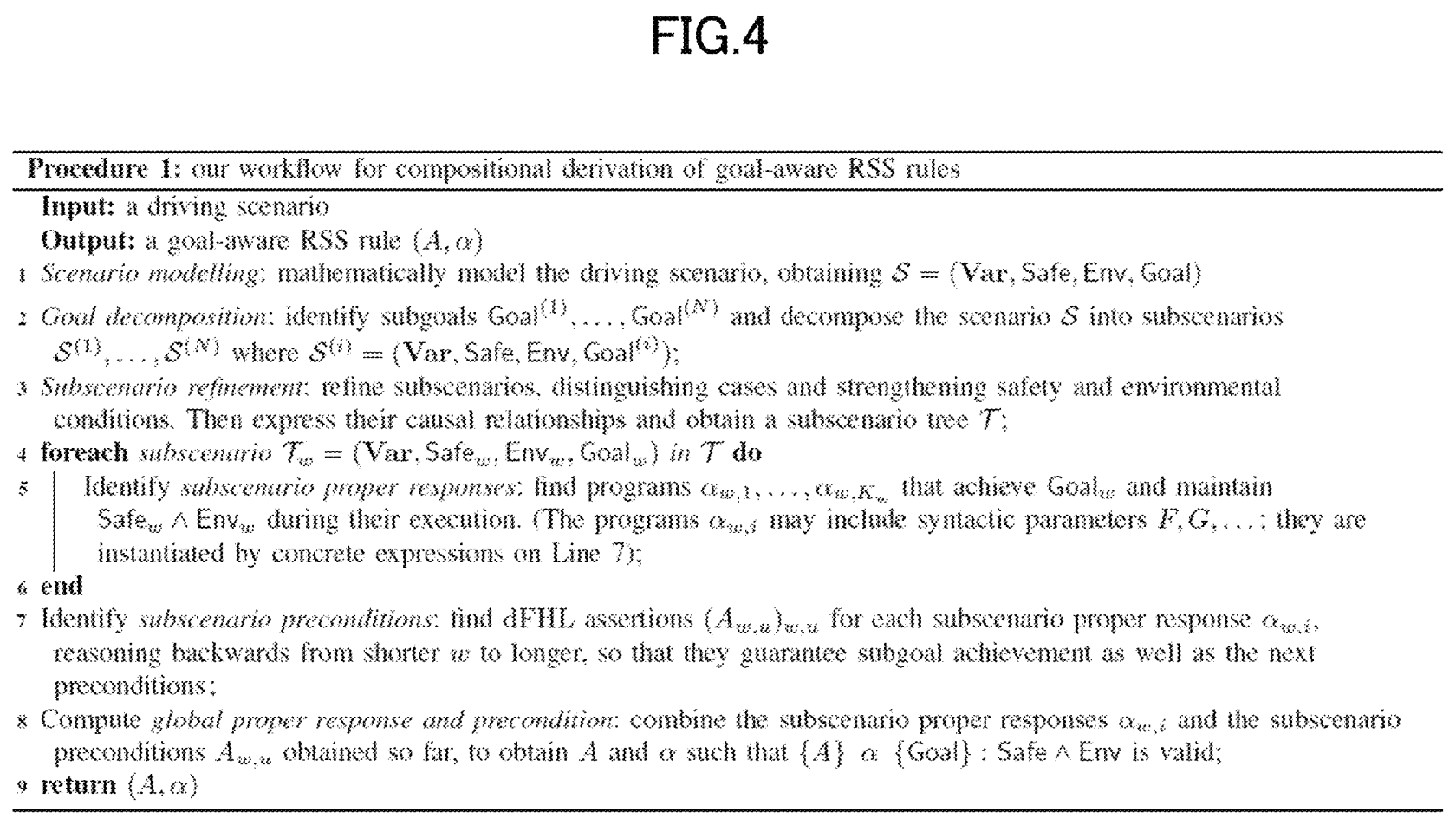

Procedure 1: our workflow for compositional derivation of goal-aware RSS rules

Input: a driving scenario

Output: a goal-aware RSS rule $(A, \alpha)$

1 *Scenario modelling*: mathematically model the driving scenario, obtaining $\mathcal{S} = (\mathbf{Var}, \mathsf{Safe}, \mathsf{Env}, \mathsf{Goal})$ 2 *Goal decomposition*: identify subgoals $\mathsf{Goal}^{(1)}, \ldots, \mathsf{Goal}^{(N)}$ and decompose the scenario $\mathcal{S}$ into subscenarios $\mathcal{S}^{(1)}, \ldots, \mathcal{S}^{(N)}$ where $\mathcal{S}^{(i)} = (\mathbf{Var}, \mathsf{Safe}, \mathsf{Env}, \mathsf{Goal}^{(i)})$;

3 *Subscenario refinement*: refine subscenarios, distinguishing cases and strengthening safety and environmental conditions. Then express their causal relationships and obtain a subscenario tree $\mathcal{T}$;

4 foreach *subscenario* $\mathcal{T}_w = (\mathbf{Var}, \mathsf{Safe}_w, \mathsf{Env}_w, \mathsf{Goal}_w)$ *in* $\mathcal{T}$ do

5 Identify *subscenario proper responses*: find programs $\alpha_{w,1}, \ldots, \alpha_{w,K_w}$ that achieve $\mathsf{Goal}_w$ and maintain $\mathsf{Safe}_w \wedge \mathsf{Env}_w$ during their execution. (The programs $\alpha_{w,i}$ may include syntactic parameters $F, G, \ldots$; they are instantiated by concrete expressions on Line 7);

6 end

7 Identify *subscenario preconditions*: find dFHL assertions $(A_{w,u})_{w,u}$ for each subscenario proper response $\alpha_{w,i}$, reasoning backwards from shorter $w$ to longer, so that they guarantee subgoal achievement as well as the next preconditions;

8 Compute *global proper response and precondition*: combine the subscenario proper responses $\alpha_{w,i}$ and the subscenario preconditions $A_{w,u}$ obtained so far, to obtain $A$ and $\alpha$ such that $\{A\}\ \alpha\ \{\mathsf{Goal}\} : \mathsf{Safe} \wedge \mathsf{Env}$ is valid;

9 return $(A, \alpha)$ scenario S
subscenario $S^{(1)}$
subscenario $S^{(2)}$
subscenario $S^{(3)}$
subscenario $S^{(4)}$
subscenario $T_{1111}$ (merge before POV1)
subscenario $T_{111}$ (merge before POV1)
subscenario $T_{11}$ (merge before POV1)
subscenario $T_{1}$
subscenario $T_{1211}$ (merge after POV1)
subscenario $T_{121}$ (merge after POV1)
subscenario $T_{12}$ (merge after POV1)
POV1
POV2
POV3
SV
SOS

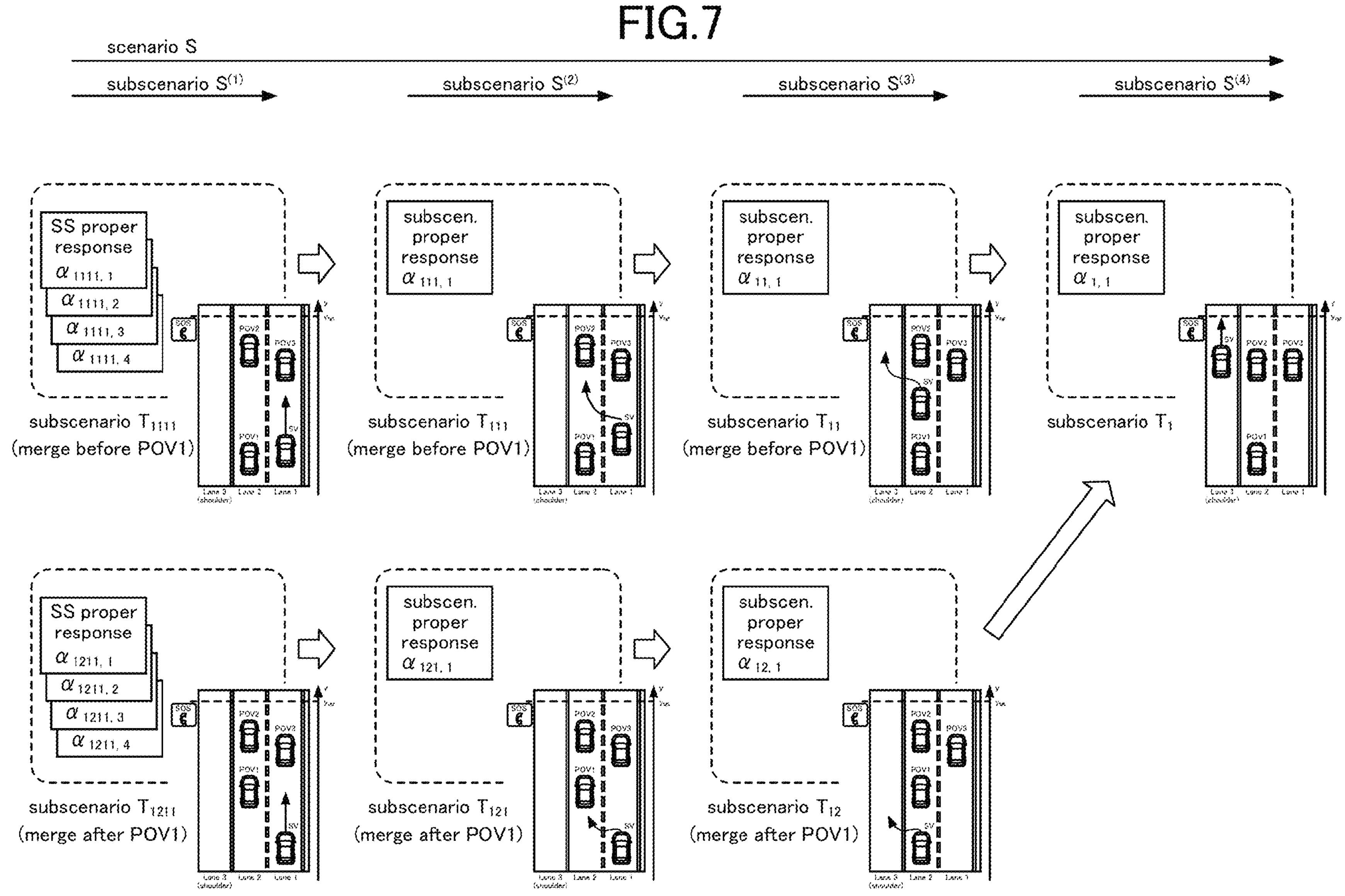
FIG.7
scenario S
subscenario $S^{(1)}$
subscenario $S^{(2)}$
subscenario $S^{(3)}$
subscenario $S^{(4)}$
SS proper response $\alpha_{1111,1}$
$\alpha_{1111,2}$
$\alpha_{1111,3}$
$\alpha_{1111,4}$
subscenario $T_{1111}$ (merge before POV1)
subscen. proper response $\alpha_{111,1}$
subscenario $T_{111}$ (merge before POV1)
subscen. proper response $\alpha_{11,1}$
subscenario $T_{11}$ (merge before POV1)
subscen. proper response $\alpha_{1,1}$
subscenario $T_1$
SS proper response $\alpha_{1211,1}$
$\alpha_{1211,2}$
$\alpha_{1211,3}$
$\alpha_{1211,4}$
subscenario $T_{1211}$ (merge after POV1)
subscen. proper response $\alpha_{121,1}$
subscenario $T_{121}$ (merge after POV1)
subscen. proper response $\alpha_{12,1}$
subscenario $T_{12}$ (merge after POV1)

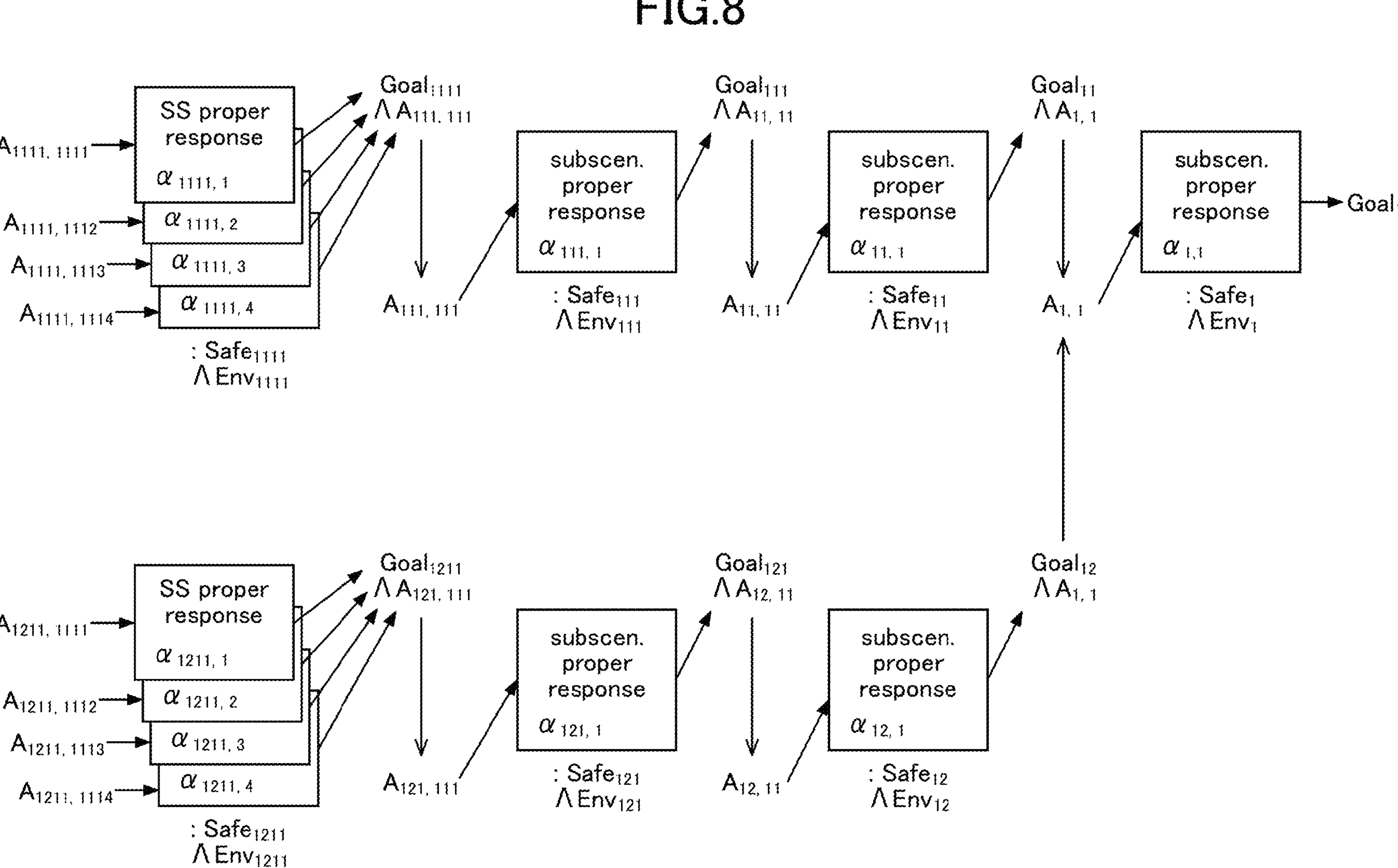
FIG.8
SS proper response $\alpha_{1111,1}$
$\alpha_{1111,2}$
$\alpha_{1111,3}$
$\alpha_{1111,4}$
: $Safe_{1111}$ $\wedge Env_{1111}$
$A_{1111,1111}$
$A_{1111,1112}$
$A_{1111,1113}$
$A_{1111,1114}$
$Goal_{1111}$ $\wedge A_{111,111}$
$A_{111,111}$
subscen. proper response $\alpha_{111,1}$
: $Safe_{111}$ $\wedge Env_{111}$
$Goal_{111}$ $\wedge A_{11,11}$
$A_{11,11}$
subscen. proper response $\alpha_{11,1}$
: $Safe_{11}$ $\wedge Env_{11}$
$Goal_{11}$ $\wedge A_{1,1}$
$A_{1,1}$
subscen. proper response $\alpha_{1,1}$
: $Safe_{1}$ $\wedge Env_{1}$
$Goal_{1}$
SS proper response $\alpha_{1211,1}$
$\alpha_{1211,2}$
$\alpha_{1211,3}$
$\alpha_{1211,4}$
: $Safe_{1211}$ $\wedge Env_{1211}$
$A_{1211,1111}$
$A_{1211,1112}$
$A_{1211,1113}$
$A_{1211,1114}$
$Goal_{1211}$ $\wedge A_{121,111}$
$A_{121,111}$
subscen. proper response $\alpha_{121,1}$
: $Safe_{121}$ $\wedge Env_{121}$
$Goal_{121}$ $\wedge A_{12,11}$
$A_{12,11}$
subscen. proper response $\alpha_{12,1}$
: $Safe_{12}$ $\wedge Env_{12}$
$Goal_{12}$ $\wedge A_{1,1}$

FIG.9

$$\frac{}{\{A\}\ \mathsf{skip}\ \{A\} : A}\ (\textsc{Skip}) \qquad \frac{\{A\}\ \alpha\ \{B\} : S \qquad \{B\}\ \beta\ \{C\} : S}{\{A\}\ \alpha;\beta\ \{C\} : S}\ (\textsc{Seq}) \qquad \frac{}{\{A[e/x]\}\ x := e\ \{A\} : A \vee A[e/x]}\ (\textsc{Assign})$$

$$\frac{\{A \wedge B\}\ \alpha\ \{C\} : S \quad \{\neg A \wedge B\}\ \beta\ \{C\} : S}{\{B\}\ \mathsf{if}\,(A)\,\alpha\ \mathsf{else}\ \beta\ \{C\} : S}\ (\textsc{If})$$

$$\frac{\{A \wedge B \wedge e_{var} \gtrsim 0 \wedge e_{var} = x\}\ \alpha\ \{B \wedge e_{var} \gtrsim 0 \wedge e_{var} \leq x - 1\} : S}{\{B \wedge e_{var} \gtrsim 0\}\ \mathsf{while}\,(A)\,\alpha\ \{\neg A \wedge B \wedge e_{var} \gtrsim 0\} : S}\ (\textsc{Wh})^{\dagger}$$

$$\frac{\begin{array}{lll} \mathsf{inv}: & A \Rightarrow e_{inv} \sim 0 & e_{var} \geq 0 \wedge e_{inv} \sim 0 \Rightarrow \mathcal{L}_{\dot{x}=f}\, e_{inv} \simeq 0 \\ \mathsf{var}: & A \Rightarrow e_{var} \geq 0 & e_{var} \geq 0 \wedge e_{inv} \sim 0 \Rightarrow \mathcal{L}_{\dot{x}=f}\, e_{var} \leq e_{ter} \\ \mathsf{ter}: & A \Rightarrow e_{ter} < 0 & e_{var} \geq 0 \wedge e_{inv} \sim 0 \Rightarrow \mathcal{L}_{\dot{x}=f}\, e_{ter} \leq 0 \end{array}}{\{A\}\ \mathsf{dwhile}\,(e_{var} > 0)\,\dot{\mathbf{x}} = \mathbf{f}\ \{e_{var} = 0 \wedge e_{inv} \sim 0\} : e_{inv} \sim 0 \wedge e_{var} \geq 0}\ (\textsc{DWh})^{\dagger}$$

$$\frac{A \Rightarrow A' \quad \{A'\}\ \alpha\ \{B'\} : S' \quad S' \wedge B' \Rightarrow B \quad S' \Rightarrow S}{\{A\}\ \alpha\ \{B\} : S}\ (\textsc{LImp})$$

$$\frac{\{A\}\ \alpha\ \{B\} : S \qquad \{A\}\ \alpha\ \{B'\} : S'}{\{A\}\ \alpha\ \{B \wedge B'\} : S \wedge S'}\ (\textsc{Conj}) \qquad \frac{A_0 \Rightarrow (\exists t \geq 0.\ C_{<t} \wedge \neg C_t \wedge B_t \wedge S_{\leq t})}{\{A\}\ \mathsf{dwhile}\,(C)\,\dot{\mathbf{x}} = \mathbf{f}\ \{B\} : S}\ (\textsc{DWh-Sol})$$

FIG.17

| | goal (%) | collision | RSS violation | | | | time | | jerk | | BC time |
|---|---|---|---|---|---|---|---|---|---|---|---|
| | | | num. (%) | avg. time | max time | max dist | avg. | max | avg. | max | |
| AC | 2350 (100%) | 0 | 300 (12.8%) | 0.09 s | 0.8 s | 82.16% | 14.97 s | 27.8 s | 0.45 m/s$^2$ | 2.65 m/s$^2$ | N/A |
| AC+$RSS^{CA}$ | 2285 (97.2%) | 0 | 0 (0%) | N/A | N/A | N/A | 16.23 s | 26.6 s | 0.36 m/s$^2$ | 0.88 m/s$^2$ | 9.8% |
| AC+$RSS^{GA}$ | 2350 (100%) | 0 | 15 (0.6%) | 0.00 s | 0.3 s | 5.16% | 14.47 s | 20.7 s | 0.80 m/s$^2$ | 4.12 m/s$^2$ | 34.6% |

SAFETY RULE GENERATION DEVICE, NAVIGATION SYSTEM, SAFETY RULE GENERATION METHOD, NAVIGATION METHOD, AND PROGRAM

TECHNICAL FIELD

The present disclosure relates to safety rule generation devices, navigation systems, safety rule generation methods, navigation methods, and programs.

BACKGROUND ART

There is a technique for formulating a safety rule for autonomous driving. The safety rule formulation technique is a technique for formulating the safety rule that can be proven to be safe mathematically. For example, Non-Patent Document 1 discloses a mathematical model called responsibility-sensitive safety (RSS).

PRIOR ART DOCUMENTS

Patent Documents

Non-Patent Document 1: Shai Shalev-Shwartz, Shaked Shammah, and Amnon Shhusua, "On a formal model of safe and scalable self-driving cars", CoRR, abs/1708.06374, 2017.

DISCLOSURE OF THE INVENTION

Problem to Be Solved by the Present Invention

However, the conventional responsibility-sensitive safety has a problem in that it cannot cope with a complex scenario. For example, Non-Patent Document 1 can only cope with a simple scenario in which an autonomous vehicle avoids a collision with another vehicle traveling in the same lane.

In view of the above technical problem, one object of an aspect of the present invention is to formulate a safety rule that can cope with a complex scenario.

Means of Solving the Problems

In order to solve the problem described above, a safety rule generation device according to an aspect of the present invention includes an input unit configured to receive an input of scenario information representing a predetermined scenario by chaining subscenarios in which a control strategy and a goal are associated; a precondition calculation unit configured to calculate a precondition for executing the control strategy while achieving the goal for each of the subscenarios; and an output unit configured to output safety rule information obtained by combining the precondition and the control strategy for each of the subscenarios.

Effects of the Present Invention

According to an aspect of the present invention, it is possible to formulate a safety rule that can cope with a complex scenario.

BRIEF DESCRIPTION OF THE DRAWINGS

FIG. 4 is a diagram illustrating an example of a work flow of a goal-aware RSS.

FIG. 7 is a conceptual diagram illustrating an example of a relationship between the subscenario and a control strategy.

FIG. 8 is a conceptual diagram illustrating an example of a procedure for calculating a precondition.

FIG. 9 is a diagram illustrating an example of a program logic system of the goal-aware RSS.

FIG. 17 is a diagram illustrating an example of experimental results.

MODE OF CARRYING OUT THE INVENTION

Figure 1:
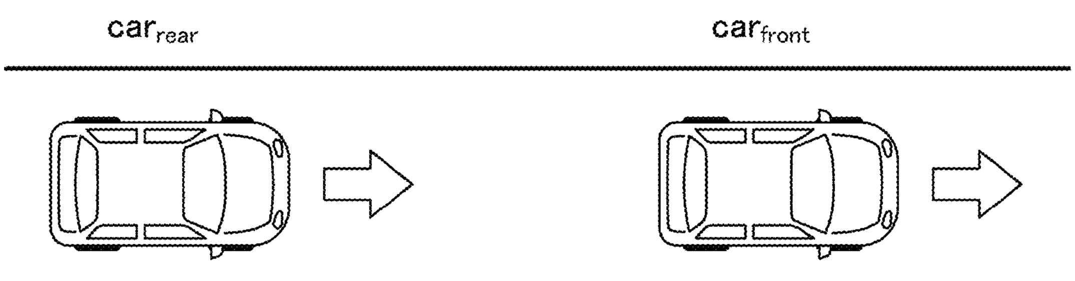
FIG. 1 is a conceptual diagram illustrating an example of a same-lane same-direction scenario.

Hereinafter, embodiments of the present invention will be described with reference to the accompanying drawings. In the specification and the drawings, constituent elements having substantially the same functional configuration are designated by the same reference numerals, and a redundant description thereof will be omitted.

Overview

<Autonomous Driving Safety Rule Formulation Technique>

An autonomous driving safety rule formulation technology is a technology for formulating a safety rule that can be mathematically proven that an autonomous vehicle is "safe as long as the safety rule is satisfied". For example, the technique derives a mathematical formula for obtaining a safe vehicle distance with which a following autonomous vehicle can avoid a collision with a preceding automobile when two automobiles are traveling in the same lane and in the same direction.

It is assumed that the autonomous driving safety rule is used for the following purposes. A first purpose is to determine the responsibility for the accident. This is based on a way of thinking that a party violating the safety rule is responsible when the accident occurs. A second purpose is to certify the safety of the autonomous vehicle. This is based on a way of thinking that the safety of the autonomous vehicle can be proven by complying with specific safety rule.

A third purpose is to monitor operations of the autonomous vehicle. This is to control the autonomous vehicle so as to comply with the safety rule when a potential violation of the safety rule by the autonomous vehicle is detected. A fourth purpose is for safety standards or specifications for the autonomous driving. A regulation can prohibit sales of the autonomous vehicle not complying with the specific safety rule, for example. A fifth purpose is for use in insurance rate calculations. This is to lower/raise the insurance rate for the autonomous vehicle that does/does not comply with the specific safety rule.

The autonomous driving safety rule is a concept that is a foundation for social demands for the autonomous driving. When it is generally recognized by society that the autonomous vehicle complying with the safety rule is safe and that the autonomous vehicle is safe even when traveling on a public road, it may be regarded that a wide spread promotion of the autonomous vehicle will occur. In addition, the autonomous driving safety rule can be used as a criterion for identifying a range of manufacturer's the responsibility. This is a way of thinking that when an accident involving the autonomous vehicle occurs, the manufacturer is not required to bear the responsibility as long as the autonomous vehicle complies with the safety rule.

<Collision Avoiding RSS (CA-RSS)>

As a conventional autonomous driving safety rule formulation technique, there is a responsibility-sensitive safety (RSS) disclosed in Non-Patent Document 1. The RSS is widely recognized as the autonomous driving safety rule. For example, the RSS is utilized in many academic studies, and reflection of the RSS on international standards is being studied.

The conventional RSS is configured to have the following logical structure. That is, if a precondition is satisfied, a safety condition can be satisfied by executing a control strategy (proper response). The control strategy is a measure for controlling the autonomous vehicle. An example of the control strategy includes a driving maneuver, such as turning a steering wheel, applying brakes, accelerating by pressing an accelerator, or the like.

The conventional RSS assumes a same-lane same-direction scenario, for example. FIG. 1 is a conceptual diagram illustrating an example of the same-lane same-direction scenario. As illustrated in FIG. 1, this scenario assumes a situation where two automobiles ($Car_{rear}$ and $Car_{front}$) are traveling in the same lane and in the same direction. At least the following automobile $Car_{rear}$ is an autonomous vehicle and is subject to the safety rule. The conventional RSS indicates that a collision can be avoided by applying an acceleration brake, as long as a vehicle distance required by a predetermined formula is maintained.

However, the conventional RSS only guarantees that the safety condition is satisfied. For example, in the same-lane same-direction scenario described above, only the safety condition of avoiding the collision is guaranteed. Hereinafter, the conventional RSS is referred to as "collision avoidance RSS (or CA-RSS)".

<Goal-Aware RSS (GA-RSS)>

In the present invention, a safety rule is formulated to guarantee that a predetermined postcondition is satisfied in addition to the safety condition. Hereinafter, the RSS proposed in the present invention is referred to as "goal-aware RSS (or GA-RSS)".

The goal-aware RSS is configured to have the following logical structure. That is, a logic is such that, if the precondition is satisfied, the predetermined postcondition can be achieved while satisfying the safety condition, by executing the control strategy.

Figure 2:
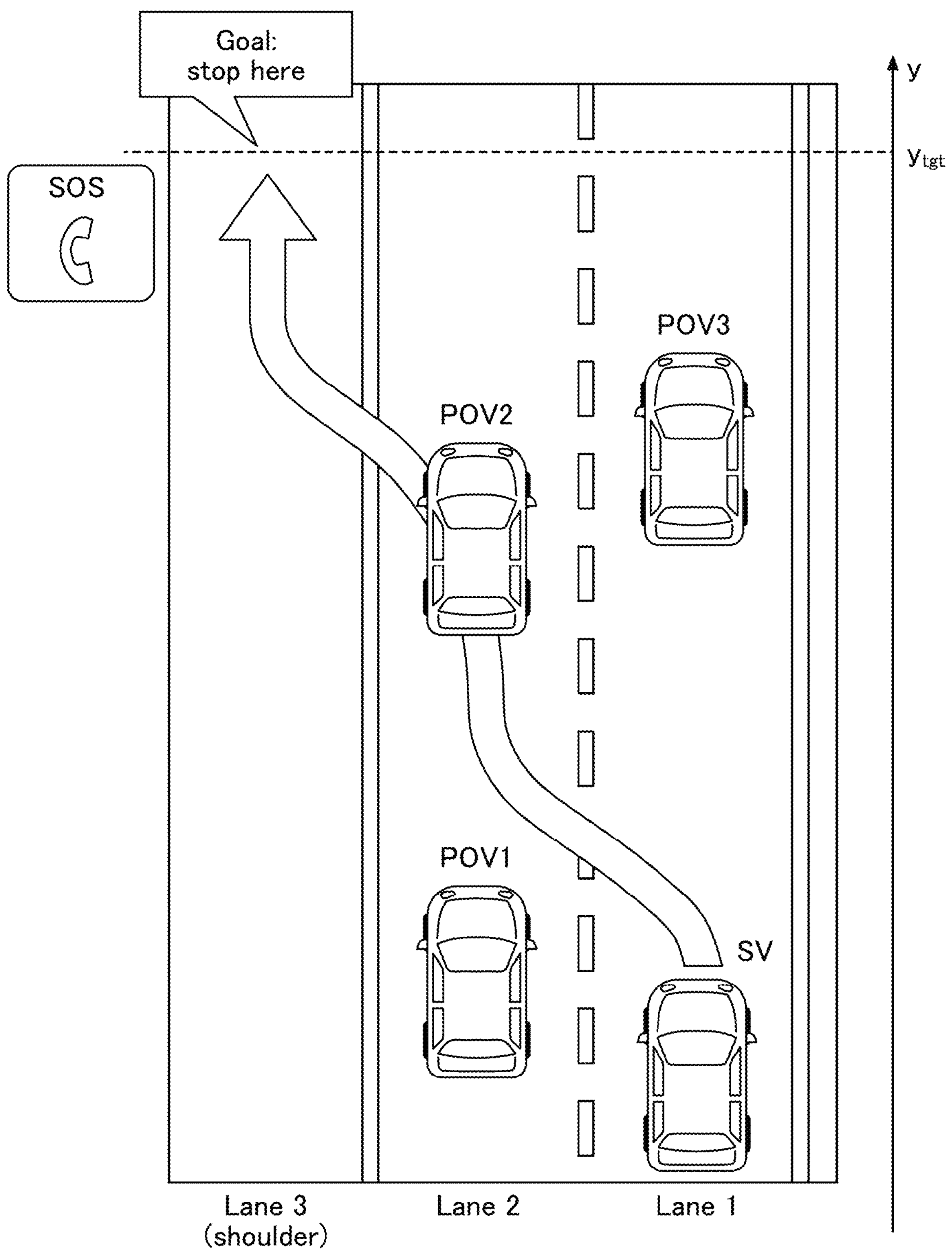
FIG. 2 is a conceptual diagram illustrating an example of a road shoulder stop scenario.

In the following embodiments, a road shoulder stop scenario is described as an example. FIG. 2 is a conceptual diagram illustrating an example of a road shoulder stop scenario. As illustrated in FIG. 2, in this scenario, in a situation where a plurality of automobiles are traveling on a road having a plurality of lanes (Lanes 1 to 3), a safety condition is that a subject vehicle (SV) maintains a safe distance from other automobiles (principal other vehicles; POVs), and at the same time, a postcondition is that the subject vehicle changes lanes a plurality of times and safely stops at a position $y_{tgt}$ of an emergency telephone (SOS) installed on a road shoulder (Lane 3).

In such a complex scenario, there are many possible ways to achieve the goal. For example, when changing lanes from a first lane (Lane 1) to a second lane (Lane 2), there is a selection of whether to merge before or after another automobile (POV1) traveling in the second lane. In this state, in order to merge in front of another automobile, there is a selection of whether to merge at the current traveling speed or to merge by accelerating. Thus, the precondition that can safely achieve a predetermined postcondition is not obvious.

Figure 3:
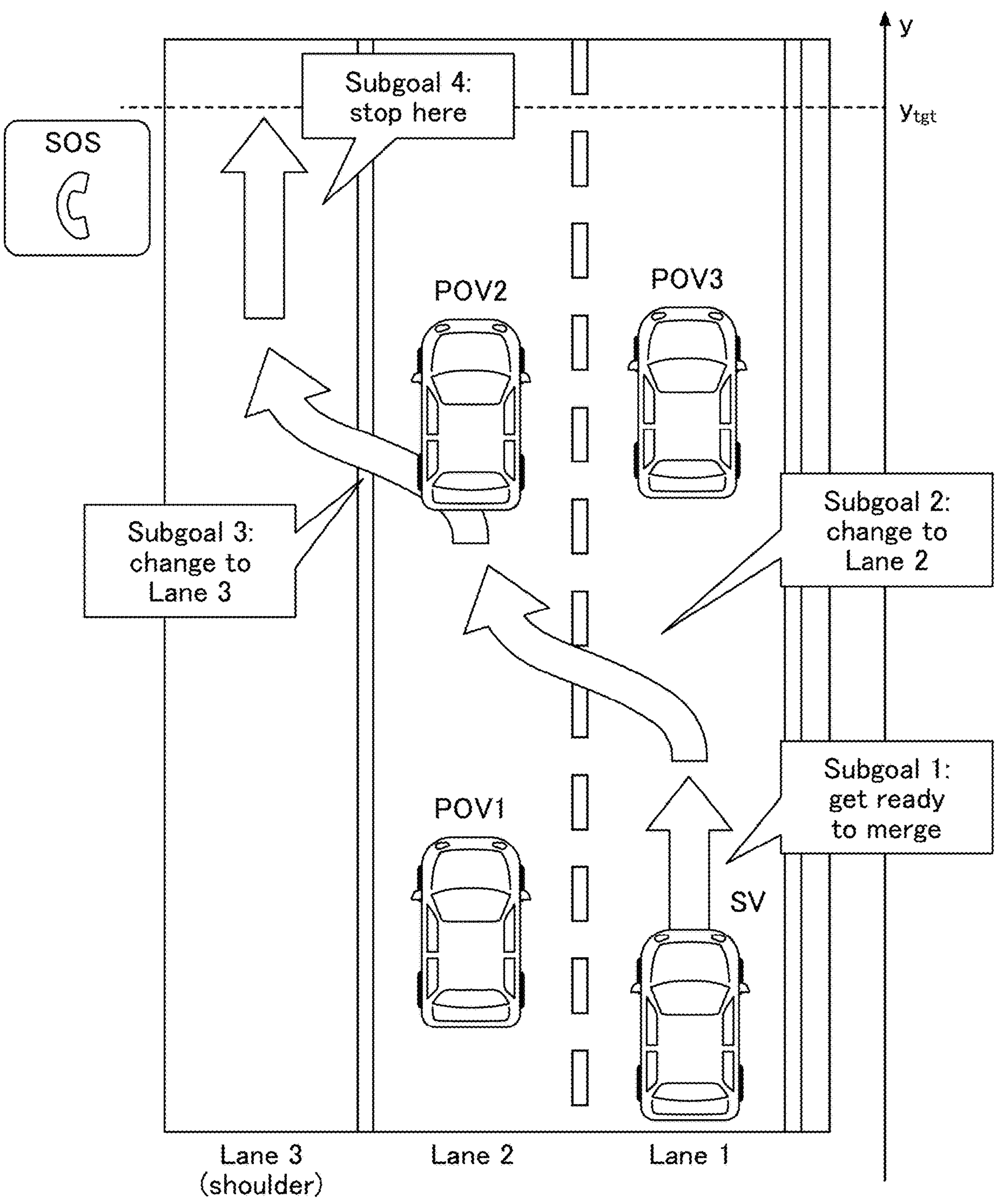
FIG. 3 is a conceptual diagram illustrating an example of a subscenario.

The goal-aware RSS divides the road shoulder stop scenario into a plurality of subscenarios in order to achieve the predetermined postcondition and the safety condition in the scenario. FIG. 3 is a conceptual diagram illustrating an example of a subscenario obtained by dividing a road shoulder stop scenario into a plurality of subscenarios.

As illustrated in FIG. 3, the goal-aware RSS divides a scenario, set with a postcondition that the vehicle safely stops at the position of the emergency telephone installed on the road shoulder, into subgoals 1 to 4. The subgoal 1 is to prepare for a merge. The subgoal 2 is to change lanes to the second lane. The subgoal 3 is to change lanes to the shoulder. The subgoal 4 is to stop at the position of the emergency telephone.

By sequentially achieving these subgoals 1 through 4, the postcondition of the scenario can be achieved. Further, if the control strategy for achieving each of the subgoals 1 through 4 can be executed while constantly satisfying the safety condition, the postcondition can be achieved while satisfying the safety condition.

Logical Work Flow

FIG. 4 is a logical work flow for the goal-aware RSS to generate the safety rule. The goal-aware RSS derives a safety rule that guarantees that the safety condition and the postcondition will be satisfied with a realistic amount of calculation, by executing the logical work flow illustrated in FIG. 4.

However, this logical work flow is not only applied to the goal-aware RSS, but is also applicable to the collision avoidance RSS, for example. The logical work flow derives the safety rule that satisfies the safety condition and the postcondition. Because the collision avoidance RSS only needs to satisfy the safety condition, the collision avoidance RSS can be applied with this logical work flow in the same manner as the goal-aware RSS, as long as the collision avoidance RSS assumes a complex scenario that can be divided into a plurality of subscenarios.

A driving scenario S is input to the work flow of the goal-aware RSS. In addition, the work flow of the goal-aware RSS outputs a safety rule ($\alpha$, A). Here, $\alpha$ represents a set of control strategies of the scenario S. A represents a set of preconditions of the scenario S.

In a first step of the work flow, a scenario S=(Var, Safe, Env, Goal) is obtained. Here, Safe represents a safety condition that an own vehicle complies with, Env represents an environmental condition that the other vehicle complies with, and Goal represents a predetermined goal. Var is a finite set of variables that covers all variables used to derive the safety rule.

A second step of the work flow divides the scenario. Specifically, N subgoals $Goal^{(1)}, \ldots, Goal^{(N)}$ are identified, and the scenario S is divided into N subscenarios $S^{(1)}, \ldots, S^{(N)}$. Here, $S^{(i)}$=(Var, Safe, Env, $Goal^{(i)}$) (i=1, . . . , N).

A third step of the work flow updates the subscenario. Specifically, the situation of each subscenario $S^{(i)}$ is identified, and a safety condition $Safe^{(i)}$ and an environmental condition $Env^{(i)}$ in the identified situation are defined. Then, a scenario tree $T=T_1, T_{11}, T_{12}, \ldots, T_{111}, T_{121}, \ldots$ representing a dependency relationship of the subscenarios $S^{(1)}, \ldots, S^{(N)}$ is generated.

Figure 5:
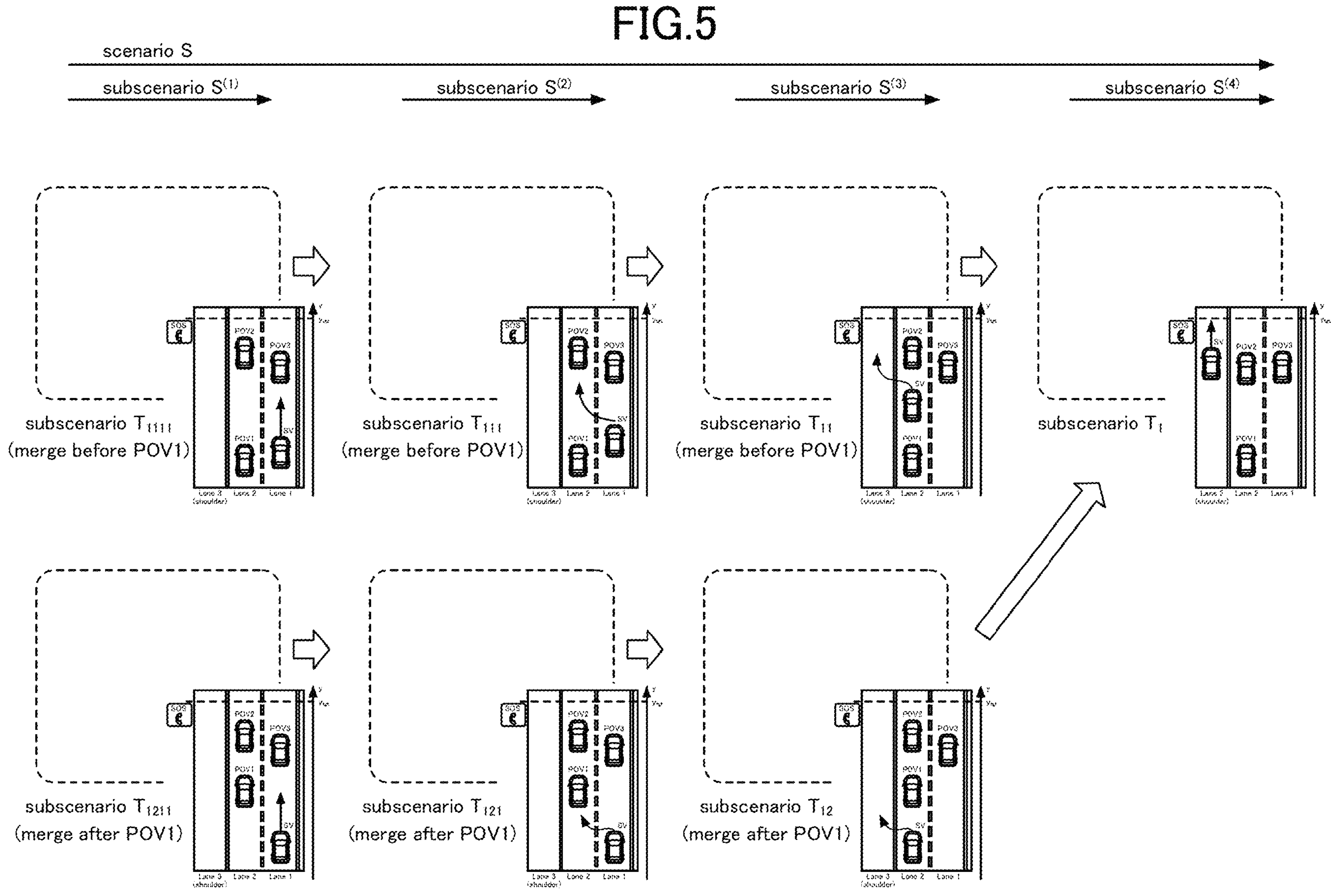
FIG. 5 is a conceptual diagram illustrating an example of a relationship between the subscenario and a scenario tree.

FIG. 5 is a conceptual diagram illustrating a correspondence relationship between the subscenario $S^{(i)}$ and a subscenario $T_w$. As illustrated in FIG. 5, a subscript i of the subscenario $S^{(i)}$ represents an order from a beginning of the scenario S. A subscript w of the subscenario $T_w$ is assigned so that a number of digits increases from an end of toward the beginning of the scenario S. Accordingly, the dependency relationship of each subscenario $T_w$ is expressed by the subscript w of the subscenario $T_w$ included in the scenario tree T.

In a fourth step through a sixth step of the work flow, the control strategy of each subscenario is identified. Specifically, for each subscenario $T_w$=(Var, $Safe_w$, $Env_w$, $Goal_w$), control strategies $\alpha_{w,1}, \ldots, \alpha_{w,Kw}$ for achieving the subgoal $Goal_w$ while satisfying the safety condition $Safe_w \Lambda Env_w$ are searched.

Figure 6:
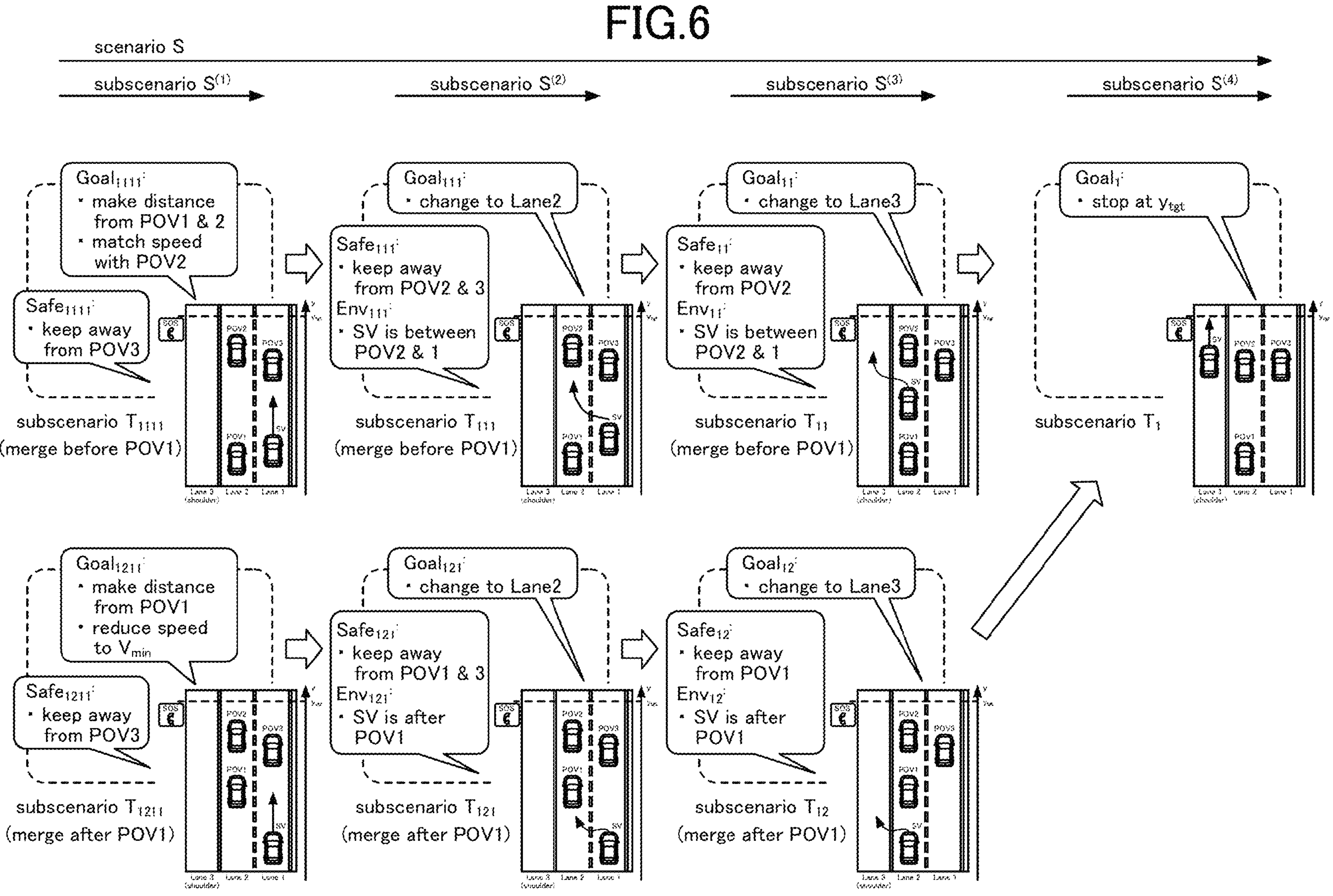
FIG. 6 is a conceptual diagram illustrating an example of a relationship of the subscenario, a subgoal, and a safety condition.

FIG. 6 is a conceptual diagram illustrating an example of the subgoal $Goal_w$, the safety condition $Safe_w$, and the environmental condition $Env_w$ in the subscenario $T_w$. As illustrated in FIG. 6, the subgoal $Goal_w$, the safety condition $Safe_w$, and the environmental condition $Env_w$ of each subscenario are more specifically defined according to a situation of the subscenario $T_w$.

FIG. 7 is a conceptual diagram illustrating a correspondence relationship between the subscenario $T_w$ and the control strategy $\alpha_{w,i}$. As illustrated in FIG. 7, one or more control strategies $\alpha_{w,i}$ are identified with respect to each subscenario $T_w$. A number of control strategies $\alpha_{w,i}$ corresponding to each subscenario $T_w$ is different, and there are subscenarios in which one control strategy $\alpha_{w,i}$ is identified, and there are subscenarios in which a plurality of control strategies $\alpha_{w,i}$ are identified.

In a seventh step of the work flow, the precondition of each subscenario is identified. Specifically, an assertion $(A_{w,u})_{w,u}$ of a program logic system is searched for each control strategy $\alpha_{w,k}$. In this state, the control strategy $\alpha_{w,k}$ is executed so as to achieve the subgoal $Goal_w$, and a backward inference is performed from w with a small number of digits to w with a large number of digits so as to satisfy the precondition of the subsequent subscenario. The program logic system of the goal-aware RSS will be described later.

FIG. 8 is a conceptual diagram illustrating a procedure for calculating a precondition $A_{w,u}$. As illustrated in FIG. 8, the precondition $A_{w,u}$ of each subscenario $T_w$ is successively calculated according to the dependency relationship between the subscenarios $T_w$. In this state, the precondition $A_{w,u}$ is calculated so as to satisfy the subgoal $Goal_w$ by executing each control strategy $\alpha_{w,k}$ while satisfying the safety condition $Safe_w \Lambda Env_w$.

In an eighth step of the work flow, the control strategy and precondition for the entire scenario are calculated. Specifically, the control strategy $\alpha_{w,k}$ and the precondition $A_{w,u}$ are combined for each of the subscenarios. Accordingly, it possible to obtain the control strategy $\alpha$ and the precondition A for which $\{A\}\alpha\{Goal\}$:SafeΛEnv is true.

In a ninth step of the work flow, the safety rule ($\alpha$, A) is output. $\alpha$ represents a set of control strategies $\alpha_{w,k}$ in the scenario S. A represents a set of preconditions $A_{w,u}$ in the scenario S.

<Program Logic System>

In the goal-aware RSS, a program logic system dFHL (differential Floyd-Hoare Logic) added with the safety condition is introduced, in order to realize the work flow illustrated in FIG. 4. The program logic system dFHL is obtained by applying an extension of ordinary differential equation (ODE) for continuous dynamics to the Hoare logic for program verification (refer to Reference Document 1), and adding a safety condition that should be true during execution of the program.

Details of the Hoare logic are disclosed in the following Reference Document 1. Details of the addition of the safety condition is disclosed in the following Reference Document 2.

[Reference Document 1] C. A. R. Hoare, "An axiomatic basis for computer programming", Communications of the ACM, vol. 12, pp. 576-580, 583, 1969.

[Reference Document 2] F. S. de Boer, U. Hannemann, and W. P. de Roever, "Hoare-style compositional proof systems for reactive shared variable concurrency", in Foundations of Software Technology and Theoretical Computer Science, 17th Conference, Kharagpur, India, Dec. 18-20, 1997.

The Hoare logic guarantees that, when the precondition A is true, and the postcondition B is true after the program $\alpha$ is executed. A, $\alpha$, and B are called "Hoare triples". The Hoare logic is expressed by the following formula.

$$\{A\}\alpha\{B\} \quad \text{[Math. 1]}$$

The program logic system dFHL adds the safety condition S to the Hoare triples. The program logic system dFHL guarantees that, when the precondition A is true, the postcondition B is true after the program $\alpha$ is executed, and the safety condition S is always true during the execution of the program $\alpha$. Hereinafter, A, $\alpha$, B, and S are referred to as "Hoare quadruples". The dFHL is expressed by the following formula.

$$\{A\}\alpha\{B\}:S \quad \text{[Math. 2]}$$

FIG. 9 illustrates an inference rule constituting the program logic system dFHL. In the goal-aware RSS, the program logic system dFHL illustrated in FIG. 9 is used to execute the seventh step of the logical work flow illustrated in FIG. 4.

<Software Implementation>

The goal-aware RSS can calculate the precondition expressed by a logical expression of several tens of lines by implementing the work flow by software. In particular, the goal-aware RSS can implement a semi-formal software using Mathematica (registered trademark) which is a known computer algebra system. Specifically, algebraic and logical symbolic operations (for example, substitution, solution of quadratic equation, proof of inequality, or the like) that are not explicitly related to program dynamics can be formalized by Mathematica.

EMBODIMENTS

An embodiment of the present invention relates to a safety rule generation system which receives a scenario that achieves a predetermined postcondition and a predetermined safety condition as inputs, and generates a safety rule corresponding to the scenario. In the present embodiment, the road shoulder stop scenario described above is assumed as being the scenario that achieves the predetermined postcondition and safety condition. The safety rule generation system according to the present embodiment converts the scenario that achieves the predetermined postcondition into a scenario tree with a plurality of chained subscenarios, and generates the safety rule in which the control strategy and the precondition are combined for each of the subscenarios.

The safety rule generation system according to the present embodiment divides a complex scenario that achieves the predetermined postcondition and safety condition into a plurality of simple subscenarios that achieve subgoals. The subgoal is a postcondition to be achieved in the process of achieving the final postcondition and safety condition. The control strategy of the subscenario represents control (driving operation) to be performed to achieve these subgoals. That is, the safety rule in the present embodiment is a safety rule indicating that the predetermined postcondition and safety condition can be finally achieved by repeating the execution of the control strategy in the subscenario corresponding to the current situation.

<Overall Configuration of Safety Rule Generation System>

Figure 10:
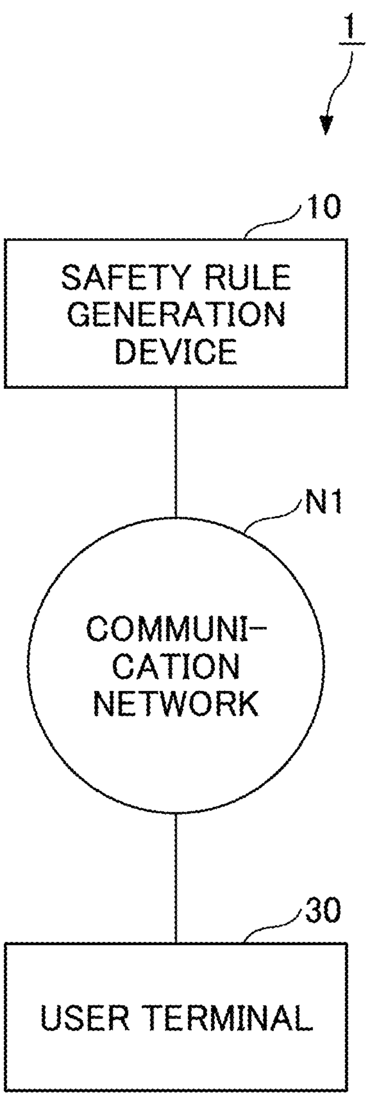
FIG. 10 is a block diagram illustrating an example of an overall configuration of a safety rule generation system.

First, an overall configuration of the safety rule generation system according to the present embodiment will be described with reference to FIG. 10. FIG. 10 is a block diagram illustrating an example of the overall configuration of the safety rule generation system according to the present embodiment.

As illustrated in FIG. 10, a safety rule generation system 1 according to the present embodiment includes a safety rule generation device 10 and a user terminal 30. The safety rule generation device 10 and the user terminal 30 are communicably connected via a communication network N1, such as a local area network (LAN), the Internet, or the like, to perform data communication.

The safety rule generation device 10 is an information processing device, such as a personal computer (PC), a work station, a server, or the like that generates a safety rule, in response to a request from the user terminal 30. The safety rule generation device 10 receives scenario information from the user terminal 30. The scenario information is information indicating a scenario for which the safety rule is to be generated. In addition, the safety rule generation device 10 generates safety rule information, and transmits the safety rule information to the user terminal 30. The safety rule information is information indicating the safety rule with respect to the received scenario information.

The user terminal 30 is an information processing terminal, such as a PC, a tablet terminal, a smartphone, or the like operated by a user. The user terminal 30 receives an input of the scenario for which the safety rule is to be generated, in response to a user operation, and transmits scenario information obtained by converting the scenario into a scenario tree to the safety rule generation device 10. The user terminal 30 receives the safety rule information from the safety rule generation device 10, and outputs the safety rule information with respect to the user.

The overall configuration of the safety rule generation system 1 illustrated in FIG. 10 is an example, and various other system configuration examples are possible depending on the application and purpose. For example, the safety rule generation device 10 may be implemented by a plurality of computers, or may be implemented as a service of cloud computing system. Further, the safety rule generation system 1 may be implemented by a stand-alone information processing device having both the functions to be provided in the safety rule generation device 10 and the functions to be provided in the user terminal 30, for example.

<Hardware Configuration of Safety Rule Generation System>

Next, a hardware configuration of the safety rule generation system 1 according to the present embodiment will be described with reference to FIG. 11.

<Hardware Configuration of Computer>

The safety rule generation device 10 and the user terminal 30 according to the present embodiment are implemented by a computer, for example. FIG. 11 is a block diagram illustrating an example of a hardware configuration of the computer according to the present exemplary embodiment.

Figure 11:
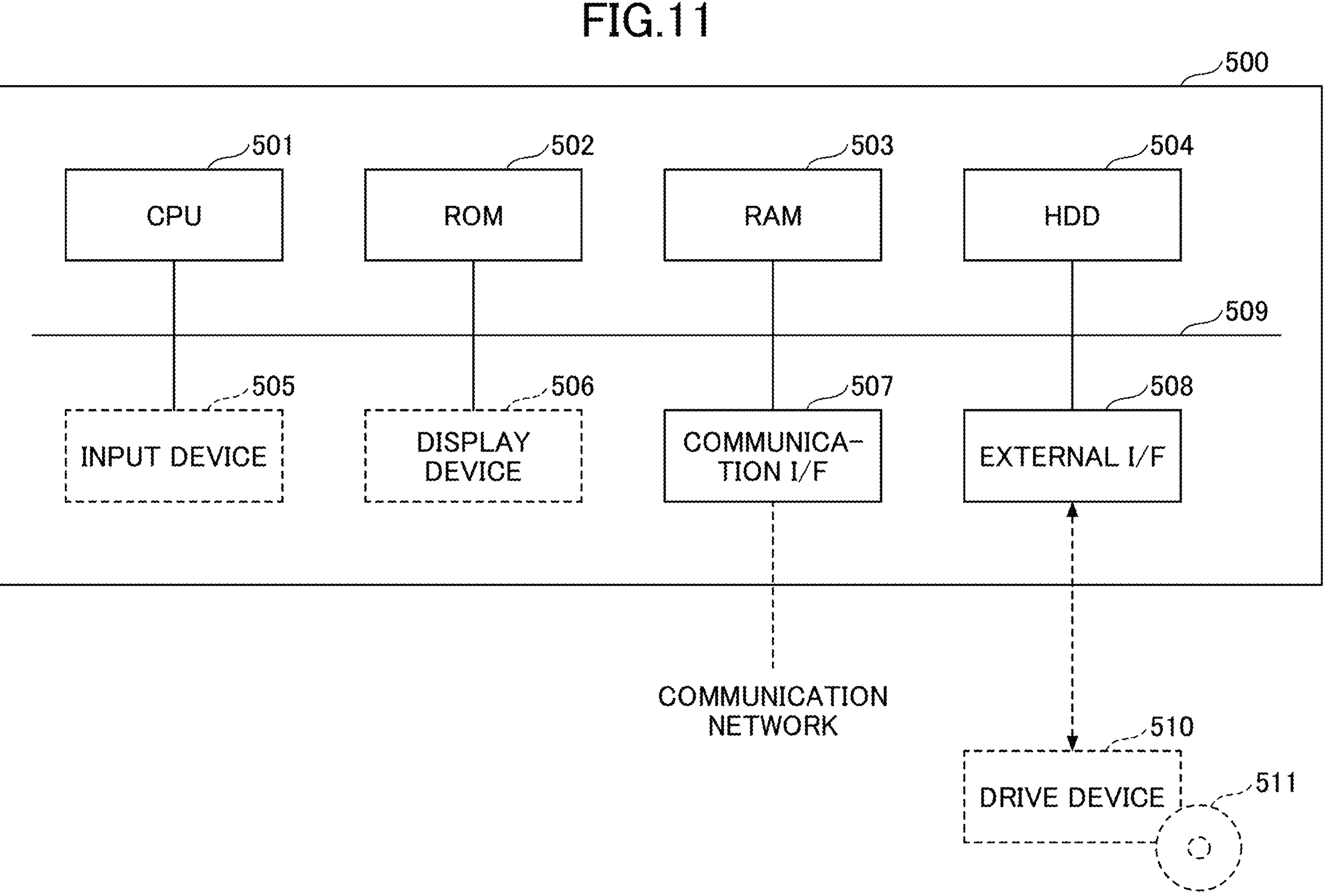
FIG. 11 is a block diagram illustrating an example of a hardware configuration of a computer.

As illustrated in FIG. 11, a computer 500 according to the present embodiment includes a central processing unit (CPU) 501, a read only memory (ROM) 502, a random access memory (RAM) 503, a hard disk drive (HDD) 504, an input device 505, a display device 506, a communication interface (I/F) 507, and an external I/F 508. The CPU 501, the ROM 502, and the RAM 503 form a so-called computer. The hardware components of the computer 500 are connected to one another via a bus line 509. The input device 505 and the display device 506 may be used by being connected to an external I/F 508.

The CPU 501 is an arithmetic device configured to read programs and data from a storage device, such as the ROM 502, the HDD 504, or the like into the RAM 503, and to perform processes thereby implementing control and functions of the entire computer 500.

The ROM 502 is an example of a non-volatile semiconductor memory (storage device) that can retain programs and data even when the power is turned off. The ROM 502 functions as a main storage device configured to store various programs, data, or the like required by the CPU 501 to execute the various programs installed in the HDD 504. In particular, the ROM 502 stores a boot program, such as a basic input/output system (BIOS), an extensible firmware interface (EFI), or the like executed when booting the computer 500, and data, such as an operating system (OS) setting, a network setting, or the like.

The RAM 503 is an example of a volatile semiconductor memory (storage device) from which the programs and the data are erased when the power is turned off. The RAM 503 is a dynamic random access memory (DRAM), a static random access memory (SRAM), or the like, for example. The RAM 503 provides a work area to which the various programs are deployed when the CPU 501 executes the various programs installed in the HDD 504.

The HDD 504 is an example of a non-volatile storage device which stores the programs and the data. The programs and the data stored in the HDD 504 include the OS which is the basic software controlling the entire computer 500, and application programs for providing various functions on the OS, or the like. The computer 500 may utilize a storage device (for example, a solid state drive (SSD) or the like) using a flash memory as a storage medium, in place of the HDD 504.

The input device 505 is a touchscreen panel, operation keys or buttons, a keyboard, a mouse, or the like used by the user to input various signals, a microphone for inputting sound data such as voice, or the like.

The display device 506 is configured by a display, such as a liquid crystal display, an organic electro-luminescence (EL) display, or the like for displaying a screen, and a speaker for outputting sound data such as voice, or the like.

The communication I/F 507 is an interface that is connected to the communication network and through which the computer 500 performs the data communication.

The external I/F 508 is an interface connected to an external device. The external device includes a drive device 510 or the like.

The drive device 510 is a device on which a recording medium 511 is set. The recording medium 511 includes a medium for optically, electrically, or magnetically recording information, such as a CD-ROM, a flexible disk, a magneto-optical disk, or the like. In addition, the recording medium 511 may include a semiconductor memory or the like for electrically recording information, such as a ROM, a flash memory, or the like. The computer 500 can read and/or write data from and/or to the recording medium 511 via the external I/F 508.

The various programs can be installed in the HDD 504 by setting the distributed recording medium 511 in the drive device 510 that is connected to the external I/F 508, and reading the various programs recorded in the recording medium 511 by the drive device 510, for example. Alternatively, the various programs can be installed in the HDD 504 by downloading the various programs from another network different from the communication network, via the communication I/F 507.

<Functional Configuration of Safety Rule Generation System>

Figure 12:
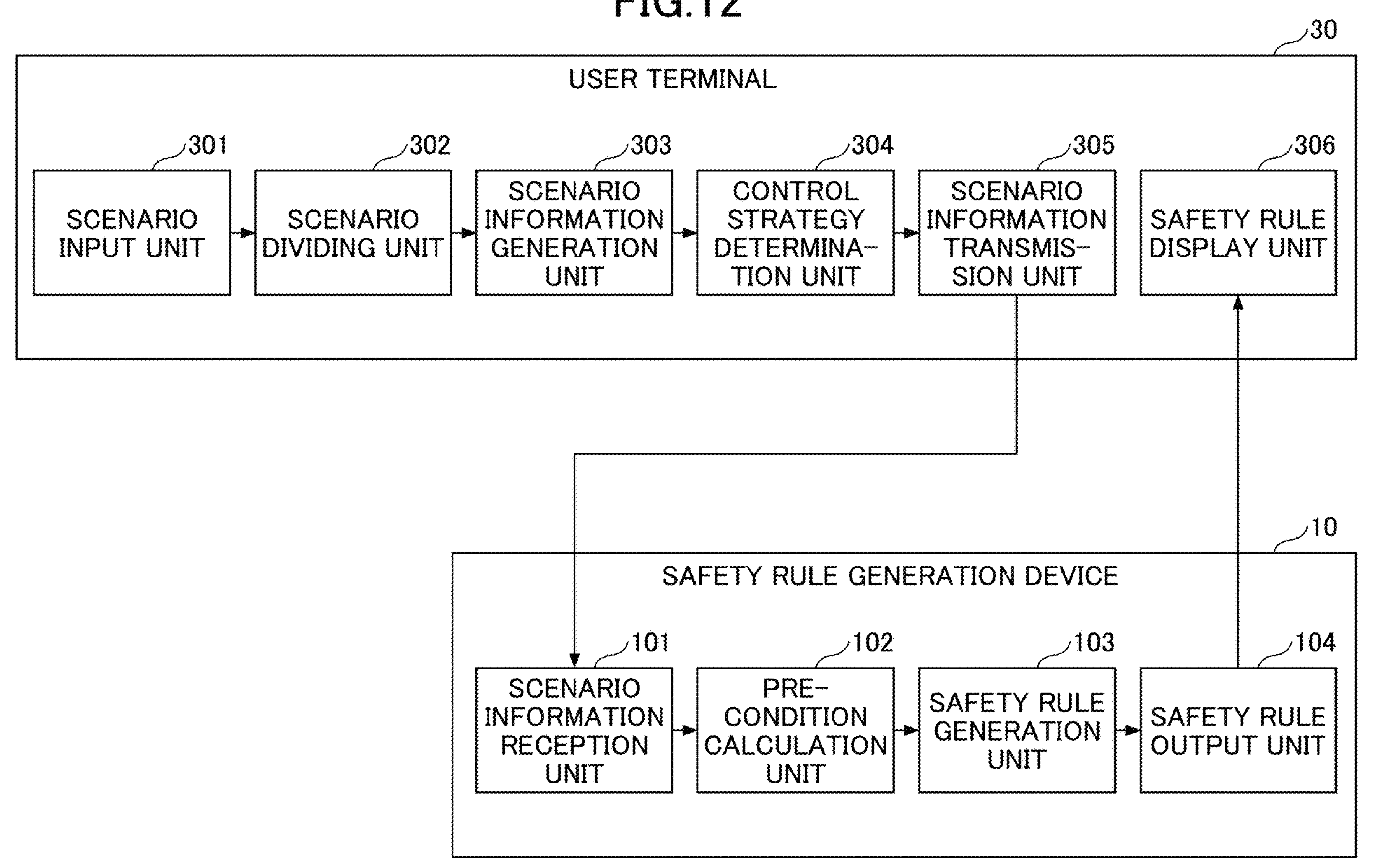
FIG. 12 is a diagram illustrating an example of a functional configuration of the safety rule generation system.

Next, a functional configuration of the safety rule generation system according to the present embodiment will be described with reference to FIG. 12. FIG. 12 is a block diagram illustrating an example of the functional configuration of the safety rule generation system 1 according to the present embodiment.

<Functional Configuration of User Terminal 30>

As illustrated in FIG. 12, the user terminal 30 according to the present embodiment includes a scenario input unit 301, a scenario dividing unit 302, a scenario information generation unit 303, a control strategy determination unit 304, a scenario information transmission unit 305, and a safety rule display unit 306.

The scenario input unit 301, the scenario dividing unit 302, the scenario information generation unit 303, the control strategy determination unit 304, the scenario information transmission unit 305, and the safety rule display unit 306 are implemented by the CPU 501 which performs processes by executing the program deployed from the HDD 504 to the RAM 503 illustrated in FIG. 11.

The scenario input unit 301 receives an input of a scenario, in response to a user operation. The scenario is information that associates the safety condition with the postcondition. The postcondition is information indicating the postcondition of the entire scenario.

The scenario dividing unit 302 divides the scenario received by the scenario input unit 301 into subscenarios, in response to a user operation. The subscenario is the information that associates the safety condition with the postcondition. The postcondition is information representing the subgoal of the subscenario.

The scenario information generation unit 303 identifies the situation of each subscenario divided by the scenario dividing unit 302, in response to a user operation. In addition, the scenario information generation unit 303 defines the safety condition of each subscenario, in response to the user operation. The scenario information generation unit 303 generates a scenario tree (hereinafter, also referred to as "scenario information") in which the subscenarios are chained in a tree shape according to the dependency relationship.

The control strategy determination unit 304 identifies the control strategy of each subscenario included in the scenario information generated by the scenario information generation unit 303. The control strategy is a control strategy that can satisfy the postcondition by being executed while satisfying the safety condition. The control strategy determination unit 304 sets the identified control strategy in the scenario information.

The scenario information transmission unit 305 transmits the scenario information, set with the control strategy by the control strategy determination unit 304, to the safety rule generation device 10.

The safety rule display unit 306 displays the safety rule information received from the safety rule generation device 10 on the display device 506 or the like.

<Functional Configuration of Safety Rule Generation Device>

As illustrated in FIG. 12, the safety rule generation device 10 according to the present embodiment includes a scenario information reception unit 101, a precondition calculation unit 102, a safety rule generation unit 103, and a safety rule output unit 104.

The scenario information reception unit 101, the precondition calculation unit 102, the safety rule generation unit 103, and the safety rule output unit 104 are implemented by the CPU 501 which performs processes by executing the program deployed from the HDD 504 to the RAM 503 illustrated in FIG. 11.

The scenario information reception unit 101 receives an input of the scenario information received from the user terminal 30.

The precondition calculation unit 102 calculates a precondition of each subscenario included in the scenario information received by the scenario information reception unit 101. In this state, the precondition calculation unit 102 calculates the precondition by using a program verifier based on the program logic system dFHL described above. The program verifier verifies whether or not the precondition that is true causes the postcondition to become true after the execution of the control strategy, and the safety condition is maintained during the execution of the control strategy.

In addition, the precondition calculation unit 102 successively calculates the precondition of each subscenario, by tracing back the chains of the subscenarios by progressive backpropagation. The precondition calculation unit 102 calculates the precondition of the subscenario so that the postcondition of the subscenario is satisfied by executing the control strategy while satisfying the safety condition, and the precondition of the subsequent subscenario is satisfied.

The safety rule generation unit 103 combines the control strategies of each of the subscenarios included in the scenario information. In addition, the safety rule generation unit 103 combines the preconditions calculated by the precondition calculation unit 102. Further, the safety rule generation unit 103 generates safety rule information including the combined control strategy and precondition.

The safety rule output unit 104 transmits the safety rule information generated by the safety rule generation unit 103 to the user terminal 30.

<Processing Procedure of Safety Rule Generation System>

Figure 13:
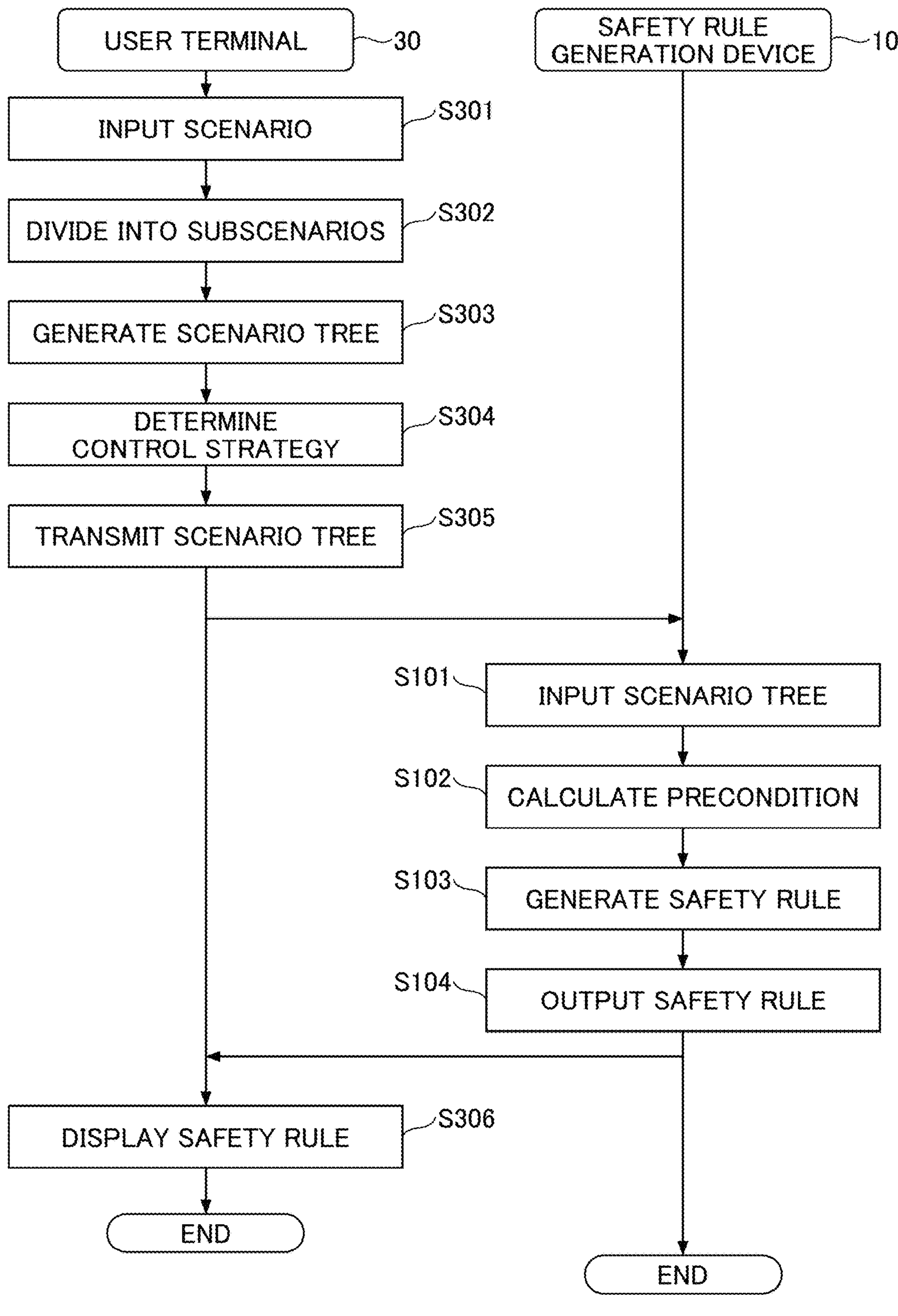
FIG. 13 is a flow chart illustrating an example of a processing procedure of a safety rule generation method.

Next, a processing procedure of a safety rule generation method executed by the safety rule generation system 1 according to the present embodiment will be described with reference to FIG. 13. FIG. 13 is a flow chart illustrating an example of the processing procedure of the safety rule generation method according to the present embodiment.

In step S301, the scenario input unit 301 of the user terminal 30 receives an input of a scenario, in response to a user operation. Next, the scenario input unit 301 sends the received scenario to the scenario dividing unit 302.

In step S302, the scenario dividing unit 302 of the user terminal 30 receives the scenario from the scenario input unit 301. Next, the scenario dividing unit 302 divides the scenario into subscenarios, in response to a user operation. Subsequently, the scenario dividing unit 302 sends a plurality of subscenarios generated by the division to the scenario information generation unit 303.

In step S303, the scenario information generation unit 303 of the user terminal 30 receives the plurality of subscenarios from the scenario dividing unit 302. Next, the scenario information generation unit 303 identifies a situation and a safety condition of each subscenario, in response to a user operation.

Subsequently, the scenario information generation unit 303 generates scenario information in which the subscenarios are chained in a tree shape according to the dependency relationship, in response to a user operation. Next, the scenario information generation unit 303 transmits the generated scenario information to the control strategy determination unit 304.

In step S304, the control strategy determination unit 304 of the user terminal 30 receives the scenario information from the scenario information generation unit 303. Next, the control strategy determination unit 304 identifies the control strategy of the subscenario for each subscenario included in the scenario information, in response to a user operation.

Subsequently, the control strategy determination unit 304 sets the identified control strategy in the scenario information. Next, the control strategy determination unit 304 transmits the scenario information set with the control strategy to the scenario information transmission unit 305.

In step S305, the scenario information transmission unit 305 of the user terminal 30 receives the scenario information from the control strategy determination unit 304. Next, the scenario information transmission unit 305 transmits the received scenario information to the safety rule generation device 10.

In step S101, the scenario information reception unit 101 of the safety rule generation device 10 receives the scenario information from the user terminal 30. Next, the scenario information reception unit 101 transmits the received scenario information to the precondition calculation unit 102.

In step S102, the precondition calculation unit 102 of the safety rule generation device 10 receives the scenario information from the scenario information reception unit 101. Next, the precondition calculation unit 102 calculates a precondition of each subscenario included in the scenario information.

Subsequently, the precondition calculation unit 102 sets the calculated precondition in the scenario information. Next, the precondition calculation unit 102 transmits the scenario information set with the precondition to the safety rule generation unit 103.

In step S103, the safety rule generation unit 103 of the safety rule generation device 10 receives the scenario information from the precondition calculation unit 102. Next, the safety rule generation unit 103 combines the control strategy and the precondition for each of the subscenarios.

Subsequently, the safety rule generation unit 103 generates safety rule information including the combined control strategies and preconditions. Next, the safety rule generation unit 103 transmits the generated safety rule information to the safety rule output unit 104.

In step S104, the safety rule output unit 104 of the safety rule generation device 10 receives the safety rule information from the safety rule generation unit 103. Next, the safety rule output unit 104 transmits the received safety rule information to the user terminal 30.

In step S306, the safety rule display unit 306 of the user terminal 30 receives the safety rule information from the safety rule generation device 10. Next, the safety rule display unit 306 displays the received safety rule information on the display device 506 or the like.

Effects of Embodiment

The safety rule generation system according to the present embodiment converts the scenario that achieves the predetermined postcondition and safety condition into the scenario tree with the plurality of chained subscenarios, and calculates the precondition with respect to the control strategy identified in each subscenario, thereby generating a safety rule that can cope with a complex scenario that achieves the predetermined postcondition and safety condition. Because the subscenario is a simple scenario for achieving a predetermined subgoal, it is possible to easily calculate the precondition with respect to the control strategy. Hence, according to the safety rule generation system according to the present embodiment, it is possible to formulate the safety rule that can cope with the complex scenario that achieves the predetermined postcondition and safety condition.

In particular, the safety rule generation system according to the present embodiment introduces a program logic system added with the safety condition, in order to calculate precondition of each subscenario. In addition, the safety rule generation system according to the present embodiment can implement the safety condition expressed by a logical expression of several tens of lines by software. Hence, according to the safety rule generation system according to the present embodiment, it is possible to calculate the safety rule that can cope with a complex scenario with a realistic amount of calculation.

Application Example 1

The safety rule derived by the goal-aware RSS can be applied to a simplex architecture. Details of the simplex architecture are disclosed in Reference Document 3 and Reference Document 4 described below.

[Reference Document 3] T. L. Crenshaw, E. Gunter, C. L. Robinson, L. Sha, and P. R. Kumar, "The simplex reference model: Limiting fault-propagation due to unreliable components in cyber-physical system architectures", in 28th IEEE International Real-Time Systems Symposium (RTSS 2007), 2007, pp. 400-412.

[Reference Document 4] D. Seto, B. Krogh, L. Sha, and A. Chutinan, "The simplex architecture for safe online control system upgrades", in Proceedings of the 1998 American Control Conference. ACC (IEEE Cat. No. 98CH36207), vol. 6, 1998, pp. 3504-3508.

Figure 14:
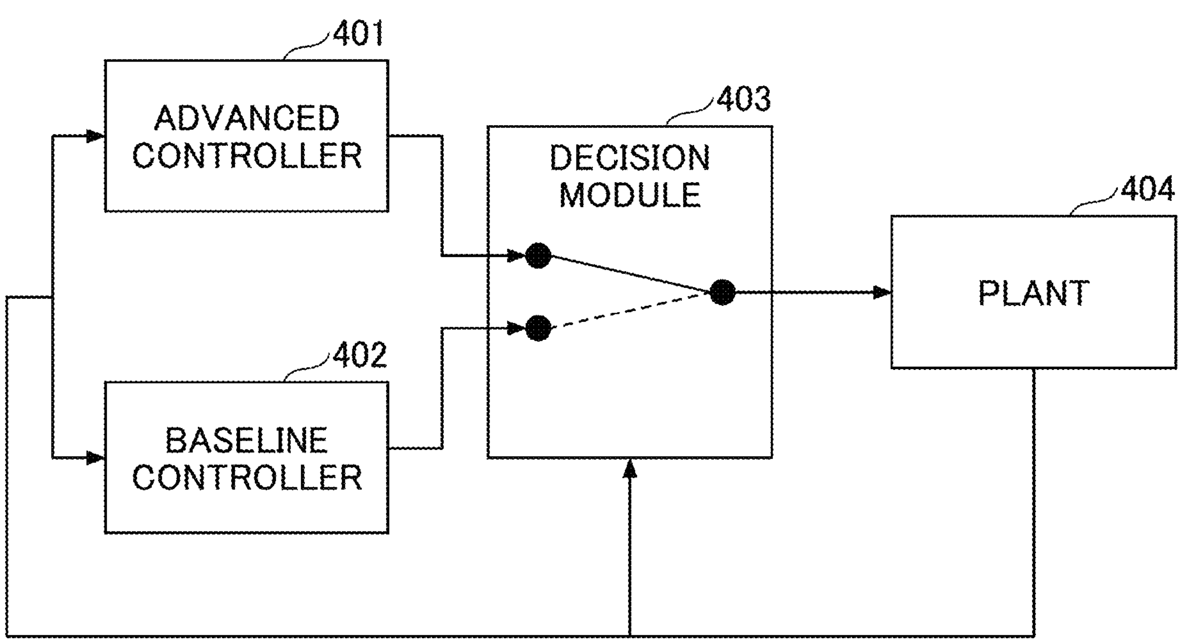
FIG. 14 is a diagram illustrating an example of a simplex architecture.

FIG. 14 is a conceptual diagram illustrating an example of the simplex architecture. As illustrated in FIG. 14, the simplex architecture is composed of an advanced controller 401, a baseline controller 402, a decision module 403, and a plant 404.

The advanced controller 401 performs a complex control that seeks not only safety but also various performance indicators. The performance indicators include comfort, speed, fuel efficiency, or the like, for example. The baseline controller 402 performs a relatively simple control that emphasizes safety.

The decision module 403 switches between the advanced controller 401 and the baseline controller 402. The decision module 403 normally uses the advanced controller 401 for better performance. On the other hand, the decision module 403 switches to the baseline controller 402 when a critical safety issue is detected.

Because the advanced controller 401 performs the complex control, it is difficult to predict and verify the operation. In contrast, because the baseline controller 402 performs the simple control, it is easy to predict and verify the operation. Thus, the simplex architecture can guarantee the safety of the system as a whole, by appropriately switching the control between the advanced controller 401 and the baseline controller 402.

A conventional collision avoidance RSS is applied to the simplex architecture. In this case, the advanced controller 401 is a general autonomous driving control module. Because the autonomous driving control module is a machine learning model trained from accumulated driving data, a determination process thereof is a black box.

The decision module 403 monitors the precondition of the collision avoidance RSS. In a case where the decision module 403 detects that the precondition may no longer be satisfied, the decision module 403 switches the control to the baseline controller 402.

The baseline controller 402 performs a control according to the control strategy of the collision avoidance RSS. The baseline controller 402 performs the control for pursuing safety without taking into consideration the performance indicator, such as comfort or the like. Hence, according to the simplex architecture applied with the collision avoidance RSS, it is possible to implement an autonomous vehicle that can normally provide a high-performance autonomous driving, and can avoid a collision when there is a safety risk.

The safety rule according to the goal-aware RSS guarantees compatibility with the safety rule according to the collision avoidance RSS. For this reason, the goal-aware RSS can be applied to the simplex architecture, similar to the collision avoidance RSS.

The safety rule according to the goal-aware RSS guarantees that the safety condition and the postcondition will be satisfied. The safety rule according to the collision avoidance RSS guarantees that the safety condition will be satisfied. For this reason, the safety rule according to the goal-aware RSS can achieve a predetermined postcondition while including the safety rule according to the collision avoidance RSS.

Therefore, according to the simplex architecture applied with the goal-aware RSS, it is possible to implement an autonomous vehicle that can normally provide a high-performance autonomous driving, and satisfy a predetermined postcondition while avoiding a collision when there is a safety risk.

Application Example 2

The simplex architecture applied with the goal-aware RSS can be used for implementing a navigation system for an autonomous vehicle, for example. A navigation system implemented with the conventional collision avoidance RSS is disclosed in Reference Document 5 described below, for example.

[Reference Document 5] International Publication No. 2018/115963

The navigation system in this application example is an in-vehicle system which controls a behavior or operation of the autonomous vehicle using the safety rule generated by the safety rule generation system 1 according to the embodiment. In order to achieve a predetermined navigation goal, the navigation system determines a route to a destination, plans behaviors during the autonomous driving, plans operations in each of the behaviors, and performs a vehicle body control for implementing the planned behaviors or operations.

The navigation system in the present application example is installed in the autonomous vehicle, for example. The navigation system is installed in an instrument panel, a center console, or the like of the autonomous vehicle, for example. The navigation system may be implemented by a cloud computing system or the like that links with an information processing apparatus set up at a remote location via a mobile communication network or the like.

<Functional Configuration of Navigation System>

Figure 15:
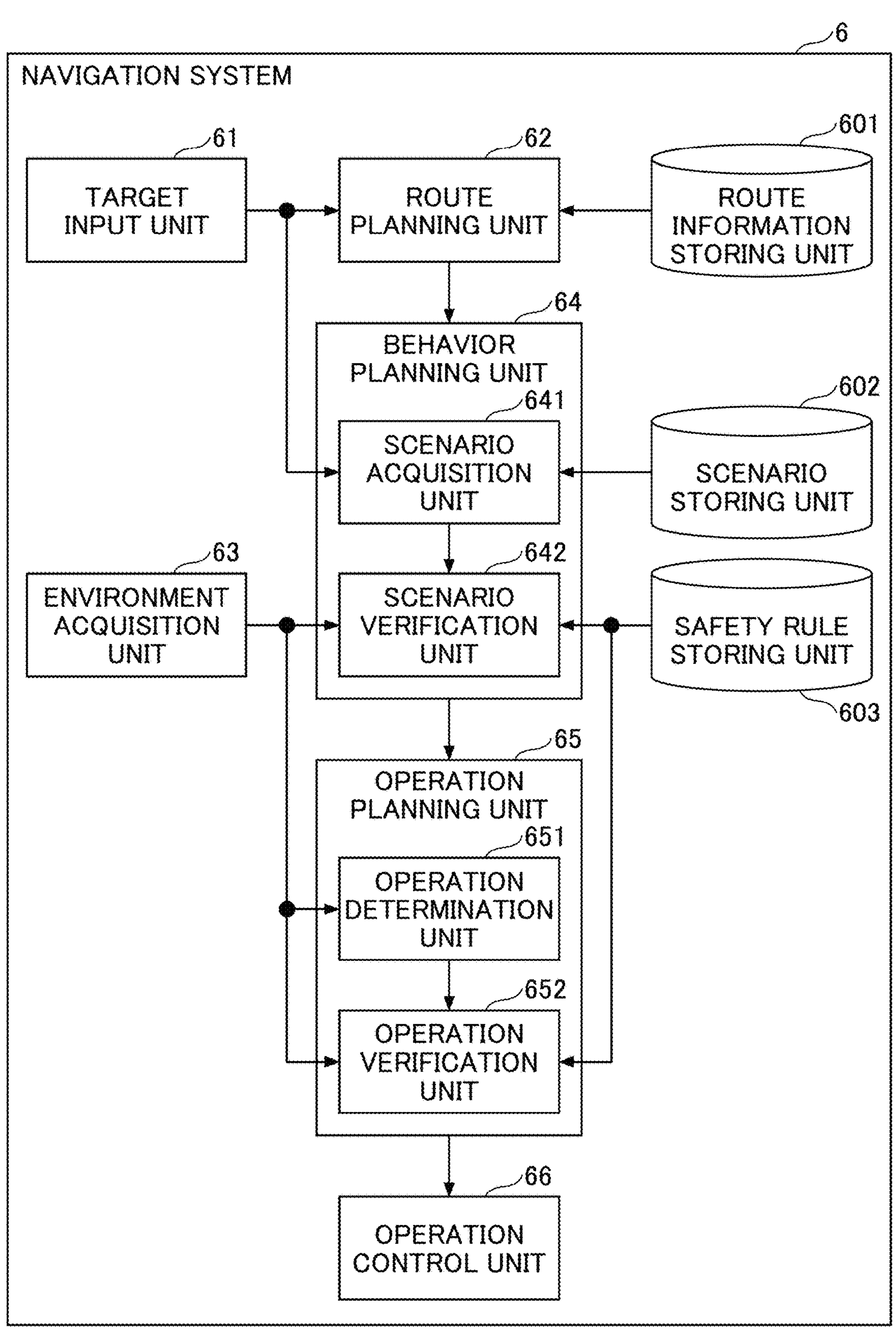
FIG. 15 is a block diagram illustrating an example of a functional configuration of a navigation system.

First, a functional configuration of the navigation system in the present application example will be described with reference to FIG. 15. FIG. 15 is a block diagram illustrating an example of the functional configuration of a navigation system 6 in this application example.

As illustrated in FIG. 15, the navigation system 6 in the this application example includes a goal input unit 61, a route planning unit 62, an environment acquisition unit 63, a behavior planning unit 64, an operation planning unit 65, an operation control unit 66, a route information storing unit 601, a scenario storing unit 602, and a safety rule storing unit 603. The behavior planning unit 64 includes a scenario acquisition unit 641 and a scenario verification unit 642. The operation planning unit 65 includes an operation determination unit 651 and an operation verification unit 652.

The route information storing unit 601 prestores route information. The route information includes map information, road information, traffic jam information, or the like. The route information may be updated at any time, using a communication means connected to the mobile communication network or the like.

The scenario storing unit 602 prestores a plurality of scenarios. A navigation goal is set in the scenario. The navigation goal corresponds to the safety condition and the postcondition of the scenario. Accordingly, by operating the autonomous vehicle according to the scenario to achieve the navigation goal, the safety condition and the postcondition of the scenario can be achieved.

The safety rule storing unit 603 prestores a safety rule corresponding to each scenario stored in the scenario storing unit 602. The safety rule is generated in advance for each scenario stored in the scenario storing unit 602 by the safety rule generation system 1 according to the embodiment. That is, the safety rule storing unit 603 stores the safety rule obtained by calculating a precondition for executing a control strategy while achieving a subgoal of a subscenario, for every subscenario obtained by dividing a scenario, for each scenario stored in the scenario storing unit 602.

The goal input unit 61 receives an input of a desired navigation goal. The navigation goal may be input by the user, or may be determined automatically based on the scenario.

The route planning unit 62 determines a route which achieves the navigation goal, based on the route information stored in the route information storing unit 601.

The environment acquisition unit 63 acquires environment information indicating an environment of the autonomous vehicle, based on an image obtained by capturing an area around the autonomous vehicle with an in-vehicle camera or the like installed in the autonomous vehicle. A number of in-vehicle camera is installed at positions such that the area around the vehicle body can be captured without blind spots. The in-vehicle camera may be installed at an arbitrary position, such as the position of a rearview mirror, a bumper, a side mirror, or the like, for example.

The behavior planning unit 64 plans the behavior of the autonomous vehicle, based on the environment information acquired by the environment acquisition unit 63. The behavior planning unit 64 determines a scenario capable of achieving the navigation goal input to the goal input unit 61, using the scenario acquisition unit 641 and the scenario verification unit 642.

The scenario acquisition unit 641 acquires the scenario for achieving the navigation goal from the scenario storing unit 602. The scenario for achieving the navigation goal is a scenario in which the postcondition includes the navigation goal and the navigation goal is achievable by achieving the postcondition.

The scenario verification unit 642 verifies whether or not each scenario can achieve the navigation goal, based on the safety rule corresponding to the scenario acquired by the scenario acquisition unit 641 and the environment information acquired by the environment acquisition unit 63.

In a case where the scenario verification unit 642 determines that the scenario cannot achieve the navigation goal, the scenario verification unit 642 rejects the scenario. In a case where a plurality of scenarios that can achieve the navigation goal are present, the scenario verification unit 642 determines a scenario to be executed according to a predetermined rule.

The operation planning unit 65 plans the operation of the autonomous vehicle, based on the environment information acquired by the environment acquisition unit 63. The operation planning unit 65 determines a navigation operation for achieving the navigation goal input to the goal input unit 61, using the operation determination unit 651 and the operation verification unit 652.

The operation determination unit 651 determines the navigation operation for achieving the navigation goal input to the goal input unit 61, based on the scenario determined by the behavior planning unit 64 and the environment information acquired by the environment acquisition unit 63.

The operation verification unit 652 verifies whether or not the control strategy corresponding to the navigation operation determined by the operation determination unit 651 can achieve the navigation goal input to the goal input unit 61, based on the safety rule corresponding to the scenario determined by the behavior planning unit 64 and the environment information acquired by the environment acquisition unit 63.

In a case where the operation verification unit 652 determines that the navigation operation can achieve the navigation goal, the operation verification unit determines to execute the navigation operation. In a case where the operation verification unit 652 determines that the navigation operation cannot achieve the navigation goal, the operation verification unit 652 rejects the navigation operation.

The operation planning unit 65 can be implemented by the simple architecture described in the application example 1. In this case, the operation determination unit 651 is implemented by the advanced controller 401 or the baseline controller 402. The operation verification unit 652 is implemented by the decision module 403. The plant 404 corresponds to the environment acquisition unit 63.

The operation control unit 66 controls the vehicle body of the autonomous vehicle, according to the navigation operation determined by the operation planning unit 65.

<Processing Procedure of Navigation System>

Figure 16:
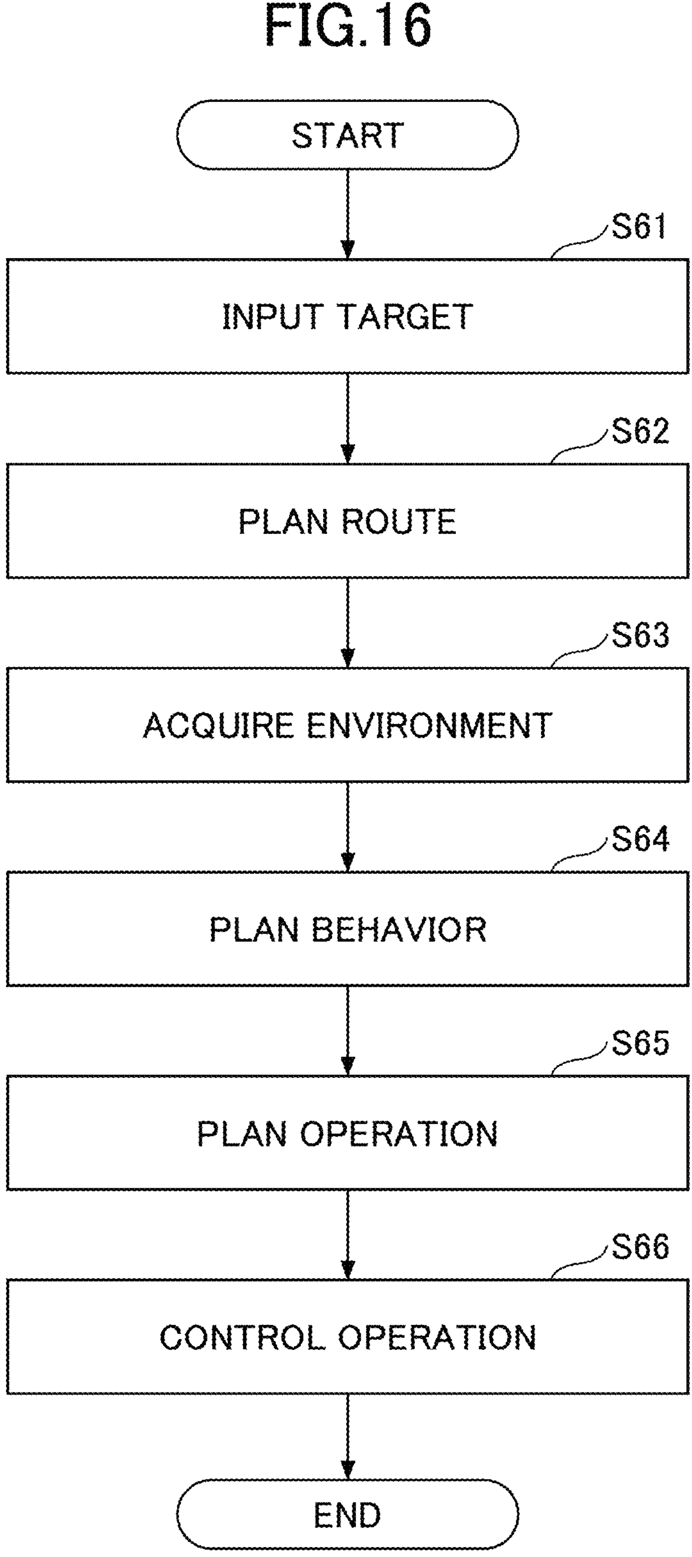
FIG. 16 is a flow chart illustrating an example of a processing procedure of a navigation method.

Next, a processing procedure of a navigation method executed by the navigation system 6 in the present application example will be described with reference to FIG. 16. FIG. 16 is a flow chart illustrating an example of the processing procedure of the navigation method according to the present application example.

In step S61, the goal input unit 61 of the navigation system 6 receives an input of a navigation goal. The navigation goal may be input by the user, or may be determined automatically based on a scenario.

In a case where the user inputs the navigation goal, the user may input the navigation goal by a console operation, or may input the navigation goal by a voice input using voice recognition, or the like.

In step S62, the route planning unit 62 of the navigation system 6 receives the navigation goal from the goal input unit 61. Next, the route planning unit 62 determines a route that achieves the navigation goal, based on the route information stored in the route information storing unit 601. Subsequently, the route planning unit 62 transmits the determined route to the behavior planning unit 64.

In step S63, the environment acquisition unit 63 of the navigation system 6 acquires the environment information indicating the environment of the autonomous vehicle. The environment information may include any information that may affect the safety condition and the postcondition of the autonomous vehicle, such as a state of another automobile traveling around the autonomous vehicle, a state of a road on which the autonomous vehicle is traveling, a state of a traffic light or a traffic sign set up on the road, or the like.

In step S64, the behavior planning unit 64 of the navigation system 6 receives the route from the route planning unit 62. Next, the behavior planning unit 64 receives the navigation goal from the goal input unit 61. Subsequently, the behavior planning unit 64 inputs the received navigation goal to the scenario acquisition unit 641.

The scenario acquisition unit 641 receives the navigation goal from the behavior planning unit 64. Next, the scenario acquisition unit 641 acquires a scenario for achieving the navigation goal from the scenario storing unit 602. The scenario acquisition unit 641 may acquire a plurality of scenarios. Subsequently, the scenario acquisition unit 641 transmits the acquired scenario to the scenario verification unit 642.

The scenario verification unit 642 receives the scenario from the scenario acquisition unit 641. Next, the scenario verification unit 642 acquires the environment information from the environment acquisition unit 63. Subsequently, the scenario verification unit 642 acquires a safety rule corresponding to the scenario received from the scenario acquisition unit 641, from the safety rule storing unit 603.

The scenario verification unit 642 verifies whether or not each scenario can achieve the navigation goal, based on the acquired safety rule and environment information. In a case where the scenario verification unit 642 determines that the scenario cannot achieve the navigation goal, the scenario verification unit 642 rejects the scenario. In a case where a plurality of scenarios that can achieve the navigation goal are present, the scenario verification unit 642 determines a scenario to be executed according to a predetermined rule. The scenario verification unit 642 may present a plurality of scenarios that can achieve the navigation goal to the user, and determine a scenario to be executed according to a user selection. The scenario verification unit 642 transmits the determined scenario to the operation planning unit 65.

In step S65, the operation planning unit 65 of the navigation system 6 receives the scenario from the behavior planning unit 64. Next, the operation planning unit 65 inputs the received scenario to the operation determination unit 651.

The operation determination unit 651 receives the scenario from the operation planning unit 65. Next, the operation determination unit 651 acquires the environment information from the environment acquisition unit 63. Subsequently, the operation determination unit 651 determines a navigation operation for achieving the navigation goal, based on the environment information acquired from the environment acquisition unit 63. Then, the operation determination unit 651 transmits the navigation operation to the operation verification unit 652.

The operation verification unit 652 receives the navigation operation from the operation determination unit 651. Next, the operation verification unit 652 acquires the environment information from the environment acquisition unit 63. Subsequently, the operation verification unit 652 acquires the safety rule corresponding to the scenario determined by the behavior planning unit 64, from the safety rule storing unit 603.

The operation verification unit 652 verifies whether or not the control strategy corresponding to the navigation operation can achieve the navigation goal, based on the safety rule and the environment information. In a case where the operation verification unit 652 determines that the navigation operation can achieve the navigation goal, the operation verification unit 652 transmits the navigation operation to the operation control unit 66.

On the other hand, in a case where the operation verification unit 652 determines that the navigation operation cannot achieve the navigation goal, the operation verification unit 652 rejects the navigation operation. In the case where the navigation operation is rejected by the operation verification unit 652, the operation determination unit 651 determines another navigation operation for achieving the navigation goal.

In step S66, the operation control unit 66 of the navigation system 6 receives the navigation operation from the operation planning unit 65. Next, the operation control unit 66 controls the vehicle body of the autonomous vehicle, according to the received navigation operation.

As described above, the navigation system 6 according to the present application example uses the safety rule based on the goal-aware RSS for two purposes. The first purpose is to use the safety rule as a condition for determining a scenario to be executed by the behavior planning unit 64. For example, in a situation where two emergency telephones are installed in a traveling direction, the first purpose uses the safety rule as the condition for selecting whether to execute a first road shoulder stop scenario in which the vehicle stops at the position of a first emergency telephone that is close to a current position, or to execute a second road shoulder stop scenario in which the vehicle stops at the position of a second emergency telephone that is far from the current position.

For example, in a case where one of the first road shoulder stop scenario and the second road shoulder stop scenario cannot satisfy the safety condition and the postcondition, the scenario satisfying the safety condition and the postcondition can be selected. In addition, in a case where both the first road shoulder stop scenario and the second road shoulder stop scenario satisfy the safety condition and the postcondition, for example, the first road shoulder stop scenario for stopping at the position close to the current position can be selected.

The second purpose is to use the safety rule as a condition for determining an operation to be executed by the operation planning unit 65. For example, in a case where the second road shoulder stop scenario in which the vehicle stops at the position of the second emergency telephone is being executed, the second purpose uses the safety rule as the condition for selecting whether to execute a navigation operation for changing lanes in front of another automobile traveling in parallel in an adjacent lane, or to execute a navigation operation for changing lanes behind another automobile.

For example, in a case where the safety condition and the postcondition cannot be satisfied by the navigation operation for changing lanes in front of another automobile, navigation the operation for changing lanes behind another automobile can be selected. In addition, in a case where the safety condition and the postcondition are satisfied even if the vehicle changes lanes in front of or behind another vehicle, for example, the navigation operation with a shorter travel time for the entire scenario can be selected.

Experimental Results

Experimental results of comparative tests for evaluating the performance of the goal-aware RSS will be described with reference to FIG. 17, FIG. 18A, and FIG. 18B. In the comparative tests, the road shoulder stop scenarios were simulated for an implementation of the advanced controller only (hereinafter referred to as "AC"), an implementation of the simplex architecture with the collision avoidance RSS (hereinafter referred to as "AC+RSS$^{CA}$"), and an implementation of the simplex architecture with the goal-aware RSS (hereinafter referred to as "AC+RSS$^{GA}$"). In an evaluation test, 2,350 road shoulder stop scenarios with different parameters were simulated for the three implementations described above.

FIG. 17 is a table illustrating aggregated experimental results. In FIG. 17, "goal" indicates a percentage of the goal achieved. "Collision" indicates a rate at which the collision occurs. "RSS violation" indicates a case where a safe vehicle distance was not maintained. "Time" indicates a travel time until the scenario ends. "Jerk" indicates a total amount of acceleration during travel. "BC time" indicates an average of the times during which the baseline controller performed the control.

As illustrated in FIG. 17, in the case of AC+RSS$^{CA}$, the collision was avoided, but cases where the postcondition cannot be satisfied occurred. In the case of AC, the postcondition is achieved while avoiding the collision, but cases where the safety condition of the RSS cannot be maintained occurred. Moreover, in the case of AC, the time until the postcondition is achieved is long in some cases. In contrast, in the case of AC+RSS$^{GA}$, the postcondition was achieved while avoiding the collision, and all cases were completed within a certain time.

Figure 18A:
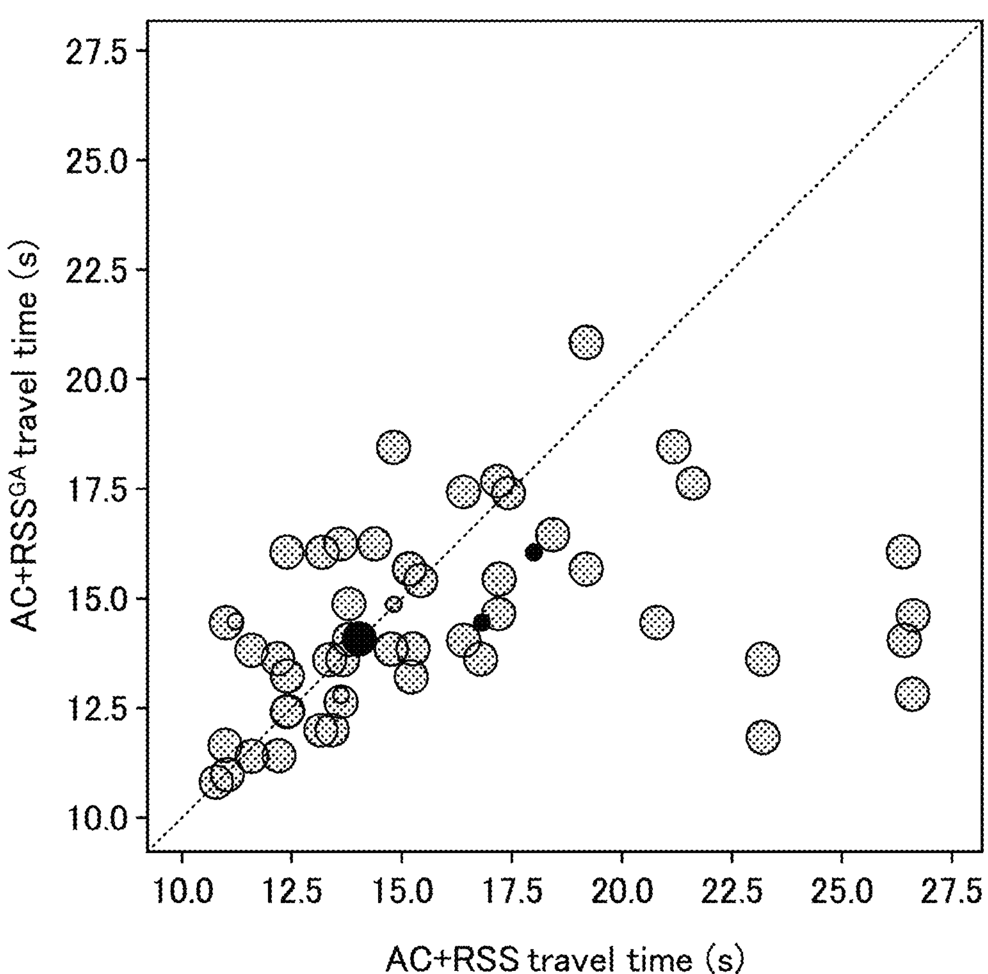
FIG. 18A is a diagram illustrating an example of distributions of travel times of the simplex architecture using the goal-aware RSS and the simplex architecture using a collision avoidance RSS.

FIG. 18A is a diagram illustrating an example of distributions of the travel times of the simplex architecture using the goal-aware RSS and the simplex architecture using the collision avoidance RSS. FIG. 18A is a graph in which the simulation results are plotted with the travel time of AC+RSS$^{GA}$ indicated on the ordinate, and the travel time of AC+RSS$^{CA}$ indicated on the abscissa. FIG. 18B is a diagram illustrating an example of distributions of the travel times of the simplex architecture using the goal-aware RSS and the advanced controller. FIG. 18B is a graph in which the simulation results are plotted with the travel time of AC+RSS$^{GA}$ indicated on the ordinate, and the travel time of AC indicated on the abscissa. The size of each circle represents a number of simulations corresponding to a combination of the plotted travel times.

Figure 18B:
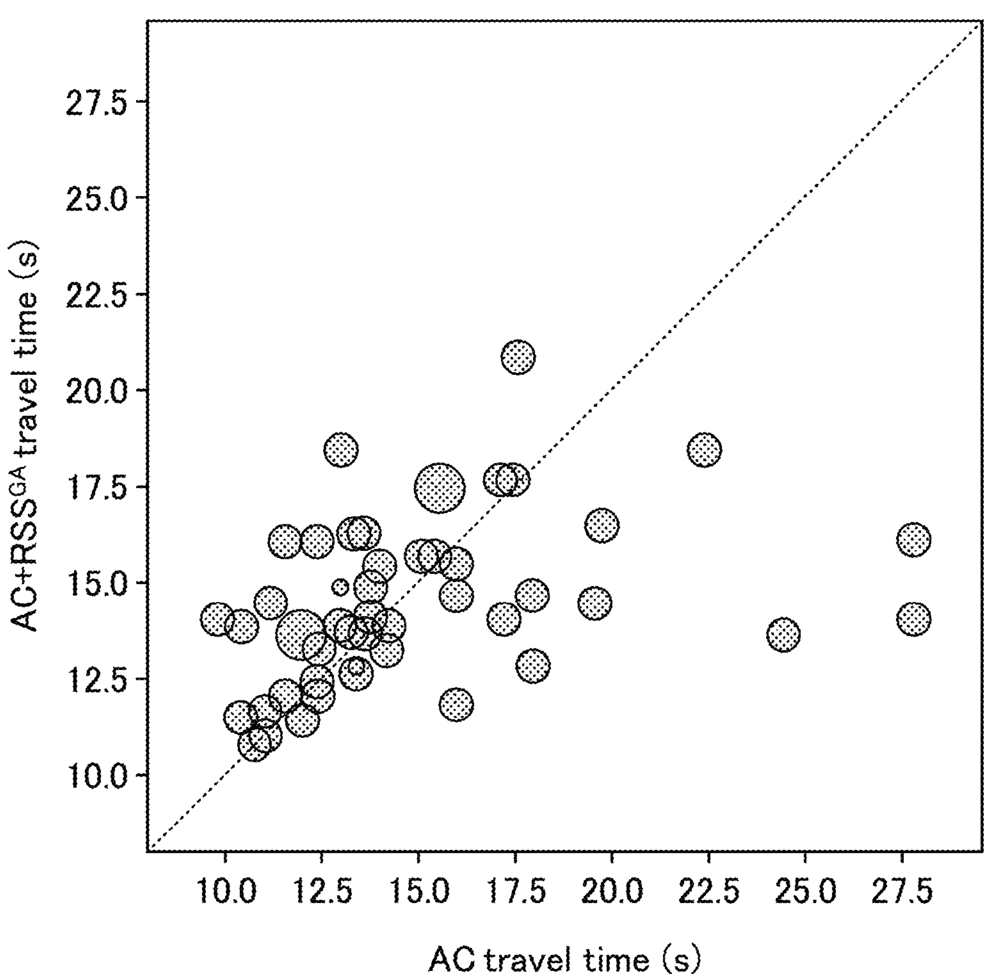
FIG. 18B is a diagram illustrating an example of distributions of the travel times of the simplex architecture using the goal-aware RSS and an advanced controller.

In FIG. 18A and FIG. 18B, the samples plotted at the lower right of the graph illustrate the cases where AC+RSS$^{GA}$ achieved the postcondition in a shorter time. As illustrated in FIG. 18A and FIG. 18B, both the comparison of AC and AC+RSS$^{CA}$, and the comparison of AC+RSS$^{CA}$ and AC+RSS$^{GA}$, had a tendency of being able to obtain more advantageous results.

As described above, the present experimental results illustrate that the predetermined postcondition can be achieved safely and in a short time, by using the safety rule of the goal-aware RSS.

Supplement

Each function of the embodiments described above can be implemented in one or a plurality of processing circuits. The "processing circuit" in the present specification includes a processor programmed to execute each function by software, such as a processor implemented by an electronic circuit, and a device, such as an application specific integrated circuit (ASIC), a digital signal processor (DSP), a field programmable gate array (FPGA), a conventional circuit module, or the like designed to execute each function described above.

Although the embodiments of the present invention are described above in detail, the present invention is not limited to these embodiments, and various variations and modifications can be made within the scope of the subject matter of the present invention described in the claims.

This application claims priority to Japanese Patent Application No. 2022-69068 filed on Apr. 19, 2022 before the Japan Patent Office, the entire contents of which are incorporated herein by reference.

DESCRIPTION OF REFERENCE NUMERALS

1: Safety rule generation system
10: Safety rule generation device
101: Scenario information reception unit
102: Precondition calculation unit
103: Safety rule generation unit
104: Safety rule output unit
30: User terminal
301: Scenario input unit
302: Scenario dividing unit
303: Scenario information generation unit
304: Control strategy determination unit
305: Scenario information transmission unit
306: Safety rule display unit
6: Navigation system
601: Route information storing unit
602: Scenario storing unit
603: Safety rule storing unit
61: Goal input unit
62: Route planning unit
63: Environment acquisition unit
64: Behavior planning unit
641: Scenario acquisition unit
642: Scenario verification unit
65: Operation planning unit
651: Operation determination unit
652: Operation verification unit
66: Operation control unit

The invention claimed is:

1. A safety rule generation device comprising:
a storage device storing a program; and
a processor configured to execute the program to perform a process including:
receiving an input of scenario information representing a predetermined scenario by chaining subscenarios in which a control strategy and a goal are associated;
calculating, for each of the subscenarios, a precondition for executing the control strategy while achieving the goal, wherein if the precondition is satisfied, a safety condition is able to be satisfied by executing the control strategy, and wherein the control strategy is a measure for controlling an autonomous vehicle, and the control strategy includes a driving maneuver;
combining control strategies of each of the subscenarios included in the scenario information, combining preconditions calculated by the calculating the precondition and generating safety rule information including the combined control strategies and preconditions; and
outputting the generated safety rule information obtained by combining the precondition and the control strategy for each of the subscenarios, wherein the safety rule information is information indicating the safety rule with respect to the scenario information and triggers a vehicle body control of the autonomous vehicle to adjust the driving maneuver including at least one of turning a steering wheel, applying brakes, or accelerating and perform autonomous driving avoiding collisions while achieving a navigation goal corresponding to the safety condition and a predetermined postcondition of the scenario.

2. The safety rule generation device as claimed in claim 1, wherein:
the goal includes a predetermined safety condition and a postcondition, the postcondition being information representing a subgoal of one subscenario, and
the calculating calculates the precondition that can satisfy the postcondition by executing the control strategy while satisfying the predetermined safety condition.

3. The safety rule generation device as claimed in claim 2, wherein the calculating calculates the precondition of one subscenario of the subscenarios so as to satisfy the precondition of a subscenario of the subscenarios, preceding the one subscenario.

4. The safety rule generation device as claimed in claim 3, wherein the calculating successively calculates the precondition by tracing back chains of the subscenarios.

5. The safety rule generation device as claimed in claim 2, wherein the calculating calculates the precondition, using a program verifier that verifies that the safety condition is maintained during execution of the control strategy.

6. The safety rule generation device as claimed in claim 1, wherein the safety rule is formulated to guarantee that the predetermined postcondition is satisfied in addition to the safety condition such that, if the precondition is satisfied, the predetermined postcondition can be achieved while satisfying the safety condition by executing the control strategy.

7. A navigation system for an autonomous vehicle, comprising:

a storage device storing a program, a plurality of scenarios for operating the autonomous vehicle, each scenario of the plurality of scenarios including chained subscenarios in which a control strategy and a goal are associated, and a safety rule obtained by calculating, for each of the subscenarios obtained by dividing each scenario of the plurality of scenarios, a precondition for executing a control strategy while achieving the goal and combining the precondition and the control strategy for each of the subscenarios, wherein:

if the precondition is satisfied, a safety condition is able to be satisfied by executing the control strategy, the control strategy is a measure for controlling the autonomous vehicle and the control strategy includes a driving maneuver, and the safety rule is indicated by safety rule information including combined control strategies and preconditions of the subscenarios; and a processor configured to execute the program to perform a process including:

acquiring environment information indicating an environment of the autonomous vehicle;

acquiring, from the storage device, a scenario for achieving a navigation goal input by a user;

verifying whether or not the scenario acquired by the acquiring the scenario can achieve the navigation goal, based on the safety rule and the environment information; and outputting the safety rule information obtained by combining the precondition and the control strategy for each of the subscenarios, wherein the safety rule information triggers a vehicle body control of the autonomous vehicle to adjust the driving maneuver including at least one of turning a steering wheel, applying brakes, or accelerating and perform autonomous driving avoiding collisions while achieving the navigation goal corresponding to the safety condition and a predetermined postcondition of the scenario.

8. A computer-implemented safety rule generation method causing a computer to perform:

an input procedure receiving an input of scenario information representing a predetermined scenario by chaining subscenarios in which a control strategy and a goal are associated;

a precondition calculation procedure calculating, for each of the subscenarios, a precondition for executing the control strategy while achieving the goal, wherein if the precondition is satisfied, a safety condition is able to be satisfied by executing the control strategy, and wherein the control strategy is a measure for controlling an autonomous vehicle, the control strategy including a driving maneuver;

a generation procedure combining control strategies of each of the subscenarios included in the scenario information, combining calculated preconditions and generating safety rule information including the combined control strategies and preconditions; and an output procedure outputting the safety rule information obtained by combining the precondition and the control strategy for each of the subscenarios, wherein the safety rule information is information indicating the safety rule with respect to the scenario information and triggers a vehicle body control of the autonomous vehicle to adjust the driving maneuver including at least one of turning a steering wheel, applying brakes, or accelerating and perform autonomous driving avoiding collisions while achieving a navigation goal corresponding to the safety condition and a predetermined postcondition of the scenario.

9. The safety rule generation method as claimed in claim 8, wherein:

the goal includes a predetermined safety condition and a postcondition, the postcondition being information representing a subgoal of one subscenario, and the precondition calculation procedure calculates the precondition that can satisfy the postcondition by executing the control strategy while satisfying the predetermined safety condition.

10. The safety rule generation method as claimed in claim 9, wherein the precondition calculation procedure calculates the precondition of one subscenario of the subscenarios so as to satisfy the precondition of a subscenario of the subscenarios, preceding the one subscenario.

11. The safety rule generation method as claimed in claim 9, wherein the precondition calculation procedure calculates the precondition, using a program verifier that verifies that the safety condition is maintained during execution of the control strategy.

12. A non-transitory computer-readable storage medium having stored therein a program which, when executed by a computer, causes the computer to perform a process including:

receiving an input of scenario information representing a predetermined scenario by chaining subscenarios in which a control strategy and a goal are associated;

calculating, for each of the subscenarios, a precondition for executing the control strategy while achieving the goal, wherein if the precondition is satisfied, a safety condition is able to be satisfied by executing the control strategy, and wherein the control strategy is a measure for controlling an autonomous vehicle, and the control strategy includes a driving maneuver;

combining control strategies of each of the subscenarios included in the scenario information, combining calculated preconditions and generating safety rule information including the combined control strategies and preconditions; and outputting the safety rule information obtained by combining the precondition and the control strategy for each of the subscenarios, wherein the safety rule information is information indicating the safety rule with respect to the scenario information and triggers a vehicle body control of the autonomous vehicle to adjust the driving maneuver including at least one of turning a steering wheel, applying brakes, or accelerating and perform autonomous driving avoiding collisions while achieving a navigation goal corresponding to the safety condition and a predetermined postcondition of the scenario.

13. The non-transitory computer-readable storage medium as claimed in claim 12, wherein:

the goal includes a predetermined safety condition and a postcondition, the postcondition being information representing a subgoal of one subscenario, and the precondition calculation procedure calculates the precondition that can satisfy the postcondition by executing the control strategy while satisfying the predetermined safety condition.

14. The non-transitory computer-readable storage medium as claimed in claim 13, wherein the precondition calculation procedure calculates the precondition of one subscenario of the subscenarios so as to satisfy the precondition of a subscenario of the subscenarios, preceding the one subscenario.

15. The non-transitory computer-readable storage medium as claimed in claim 13, wherein the precondition calculation procedure calculates the precondition, using a program verifier that verifies that the safety condition is maintained during execution of the control strategy.

16. A navigation system for an autonomous vehicle, comprising:

a storage device storing a program, a scenario for operating the autonomous vehicle, the scenario including chained subscenarios in which a control strategy and a goal are associated, and a safety rule obtained by calculating, for each of the subscenarios obtained by dividing the scenario, a precondition for executing the control strategy while achieving the goal and combining the precondition and the control strategy for each of the subscenarios, wherein:

if the precondition is satisfied, a safety condition is able to be satisfied by executing the control strategy, the control strategy is a measure for controlling the autonomous vehicle and the control strategy includes a driving maneuver, and the safety rule is indicated by safety rule information including combined control strategies and preconditions of the subscenarios; and a processor configured to execute the program to perform a process including:

acquiring environment information indicating an environment of the autonomous vehicle;

determining a navigation operation for achieving a navigation goal, based on the scenario and the environment information;

verifying whether or not the control strategy corresponding to the navigation operation can achieve the navigation goal, based on the safety rule and the environment information; and outputting the safety rule information obtained by combining the precondition and the control strategy for each of the subscenarios, wherein the safety rule information triggers a vehicle body control of the autonomous vehicle to adjust the driving maneuver including at least one of turning a steering wheel, applying brakes, or accelerating and perform autonomous driving avoiding collisions while achieving the navigation goal corresponding to the safety condition and a predetermined postcondition of the scenario.

17. A computer-implemented navigation method for an autonomous vehicle, wherein a scenario for operating the autonomous vehicle, the scenario including chained subscenarios in which a control strategy and a goal are associated, and a safety rule obtained by calculating, for each of the subscenarios obtained by dividing the scenario, a precondition for executing the control strategy while achieving the goal and combining the precondition and the control strategy for each of the subscenarios are stored in a storage device, wherein:

if the precondition is satisfied, a safety condition is able to be satisfied by executing the control strategy, the control strategy is a measure for controlling the autonomous vehicle and the control strategy includes a driving maneuver, and the safety rule is indicated by safety rule information including combined control strategies and preconditions of the subscenarios;

and the navigation method causes a computer to perform:

an environment acquisition procedure acquiring environment information indicating an environment of the autonomous vehicle;

an operation determination procedure determining a navigation operation for achieving a navigation goal, based on the scenario and the environment information;

an operation verification procedure verifying whether or not the control strategy corresponding to the navigation operation can achieve the navigation goal, based on the safety rule and the environment information; and an output procedure outputting the safety rule information obtained by combining the precondition and the control strategy for each of the subscenarios, wherein the safety rule information triggers a vehicle body control of the autonomous vehicle to adjust the driving maneuver including at least one of turning a steering wheel, applying brakes, or accelerating and perform autonomous driving avoiding collisions while achieving the navigation goal corresponding to the safety condition and a predetermined postcondition of the scenario.

18. A computer-implemented navigation method for an autonomous vehicle, wherein a plurality of scenarios for operating the autonomous vehicle, each scenario of the plurality of scenarios including chained subscenarios in which a control strategy and a goal are associated, and a safety rule obtained by calculating, for each of the subscenarios obtained by dividing each scenario of the plurality of scenarios, a precondition for executing the control strategy while achieving the goal and combining the precondition and the control strategy for each of the subscenarios are stored in a storage device, wherein:

if the precondition is satisfied, a safety condition is able to be satisfied by executing the control strategy, the control strategy is a measure for controlling the autonomous vehicle and the control strategy includes a driving maneuver, and the safety rule is indicated by safety rule information including combined control strategies and preconditions of the subscenarios, and the navigation method causes a computer to perform:

an environment acquisition procedure acquiring environment information indicating an environment of the autonomous vehicle;

a scenario acquisition procedure acquiring the scenario for achieving a navigation goal input by a user;

a scenario verification procedure verifying whether or not the scenario acquired in the scenario acquisition procedure can achieve the navigation goal, based on the safety rule and the environment information; and an output procedure outputting the safety rule information obtained by combining the precondition and the control strategy for each of the subscenarios, wherein the safety rule information triggers a vehicle body control of the autonomous vehicle to adjust the driving maneuver including at least one of turning a steering wheel, applying brakes, or accelerating and perform autonomous driving avoiding collisions while achieving the navigation goal corresponding to the safety condition and a predetermined postcondition of the scenario.

19. A non-transitory computer-readable storage medium having stored therein a program for an autonomous vehicle, wherein a scenario for operating the autonomous vehicle, the scenario including chained subscenarios in which a control strategy and a goal are associated, and a safety rule obtained by calculating, for each of the subscenarios obtained by dividing the scenario, a precondition for executing the control strategy while achieving the goal and combining the precondition and the control strategy for each of the subscenarios are stored in a storage device, wherein:

if the precondition is satisfied, a safety condition is able to be satisfied by executing the control strategy, the control strategy is a measure for controlling the autonomous vehicle and the control strategy includes a driving maneuver, and the safety rule is indicated by safety rule information including combined control strategies and preconditions of the subscenarios, and the program which, when executed by a computer, causes the computer to perform a process including:

acquiring environment information indicating an environment of the autonomous vehicle;

determining a navigation operation for achieving a navigation goal, based on the scenario stored in the storage device and the environment information;

verifying whether or not the control strategy corresponding to the navigation operation can achieve the navigation goal, based on the safety rule stored in the storage device and the environment information; and outputting the safety rule information obtained by combining the precondition and the control strategy for each of the subscenarios, wherein the safety rule information triggers a vehicle body control of the autonomous vehicle to adjust the driving maneuver including at least one of turning a steering wheel, applying brakes, or accelerating and perform autonomous driving avoiding collisions while achieving the navigation goal corresponding to the safety condition and a predetermined postcondition of the scenario.

20. A non-transitory computer-readable storage medium having stored therein a program for an autonomous vehicle, wherein a plurality of scenarios for operating the autonomous vehicle, each scenario of the plurality of scenarios including chained subscenarios in which a control strategy and a goal are associated, and a safety rule obtained by calculating, for each of the subscenarios obtained by dividing each scenario of the plurality of scenarios, a precondition for executing a control strategy while achieving the goal and combining the precondition and the control strategy for each of the subscenarios are stored in a storage device, wherein:

if the precondition is satisfied, a safety condition is able to be satisfied by executing the control strategy, the control strategy is a measure for controlling the autonomous vehicle and the control strategy includes a driving maneuver, and the safety rule is indicated by safety rule information including combined control strategies and preconditions of the subscenarios, and the program which, when executed by a computer, causes the computer to perform a process including:

acquiring environment information indicating an environment of the autonomous vehicle;

acquiring the scenario for achieving a navigation goal input by a user;

verifying whether or not the scenario acquired by the acquiring the scenario can achieve the navigation goal, based on the safety rule and the environment information; and outputting the safety rule information obtained by combining the precondition and the control strategy for each of the subscenarios, wherein the safety rule information triggers a vehicle body control of the autonomous vehicle to adjust the driving maneuver including at least one of turning a steering wheel, applying brakes, or accelerating and perform autonomous driving avoiding collisions while achieving the navigation goal corresponding to the safety condition and a predetermined postcondition of the scenario.

* * * * *